(12) United States Patent
Kitamaru et al.

(10) Patent No.: US 7,689,915 B2
(45) Date of Patent: Mar. 30, 2010

(54) IMAGE PROCESSING APPARATUS AND IMAGE PROCESSING METHOD USING IMAGE ATTRIBUTE INFORMATION AND THUMBNAIL DISPLAYS FOR DISPLAY CONTROL

(75) Inventors: Yoshinobu Kitamaru, Kawasaki (JP); Atsushi Kumagai, Yokohama (JP); Kenji Hatori, Yokohama (JP); Keiichiro Yuasa, Setagaya-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1279 days.

(21) Appl. No.: 11/190,920

(22) Filed: Jul. 28, 2005

(65) Prior Publication Data

US 2006/0026523 A1 Feb. 2, 2006

(30) Foreign Application Priority Data

Jul. 29, 2004 (JP) .............................. 2004-221951
Sep. 2, 2004 (JP) .............................. 2004-255774

(51) Int. Cl.
*G06F 3/00* (2006.01)
*G06F 17/00* (2006.01)
*G06K 9/30* (2006.01)

(52) U.S. Cl. ........................ 715/711; 715/205; 715/246; 715/273; 715/800; 715/838; 715/224; 715/226; 382/296; 382/298

(58) Field of Classification Search ................. 715/200, 715/204, 205, 234, 243, 244, 246, 251, 255, 715/273, 760, 799, 800, 802, 803, 837, 838; 707/1, 3, 4, 6, 100, 101, 102, 103 R, 200; 382/276, 295, 296, 297, 298, 305
See application file for complete search history.

(56) References Cited

U.S. PATENT DOCUMENTS 6,324,554 B1 * 11/2001 Watanabe et al. ........... 715/235
6,335,746 B1 * 1/2002 Enokida et al. ............. 715/839

(Continued)

FOREIGN PATENT DOCUMENTS

JP 10-11343 1/1998

(Continued)

OTHER PUBLICATIONS

Photoshop Album—Classify by Adding Tag, © 2005, http://www.adobe.co.jp/products/photoshopalbum/overview/page2.html#2_4 (partial English translation attached).

(Continued)

*Primary Examiner*—Laurie Ries
*Assistant Examiner*—Maikhanh Nguyen
(74) *Attorney, Agent, or Firm*—Fitzpatrick, Cella, Harper & Scinto

(57) ABSTRACT

An information management apparatus includes a determination unit which determines the type of information designated by an input unit, and a display control unit which controls, in accordance with the type of information determined by the determination unit, the display form of an information presentation portion presenting explanatory information on the designated information. When the information designated by the input unit is an image in a folder, the explanatory information contains explanatory information on the image, and when the input unit designates an object other than an image in a folder, contains explanatory information on the folder.

12 Claims, 25 Drawing Sheets

U.S. PATENT DOCUMENTS

| | | | |
|---|---|---|---|
| 6,868,192 B2 * | 3/2005 | Takiguchi | 382/299 |
| 7,296,242 B2 * | 11/2007 | Agata et al. | 715/793 |
| 7,457,485 B2 * | 11/2008 | Inou | 382/305 |
| 2002/0054017 A1 | 5/2002 | Agata et al. | 345/157 |
| 2003/0079884 A1 | 5/2003 | York et al. | 166/380 |
| 2003/0154190 A1 | 8/2003 | Misawa et al. | 707/1 |
| 2003/0184653 A1 | 10/2003 | Ohkubo | 348/207.1 |
| 2003/0227468 A1 | 12/2003 | Takeda | 345/619 |
| 2004/0141016 A1 | 7/2004 | Fukatsu et al. | 345/856 |

FOREIGN PATENT DOCUMENTS

| | | |
|---|---|---|
| JP | 10-40063 | 2/1998 |
| JP | 2000-30829 | 1/2000 |
| JP | 2001-052191 | 2/2001 |
| JP | 2001-312350 | 11/2001 |
| JP | 2002-312401 | 10/2002 |
| JP | 2003-67421 | 3/2003 |
| JP | 2003-108976 | 4/2003 |
| JP | 2003-242004 | 8/2003 |
| JP | 2004-13575 | 1/2004 |
| JP | 2004-178512 | 6/2004 |
| JP | 2004-213482 | 7/2004 |
| KR | 2002-0059841 | 7/2002 |
| KR | 2002-0075359 | 10/2002 |
| WO | WO 01/02984 A2 | 1/2001 |

OTHER PUBLICATIONS

Usability Improvements in Windows XP for Knowledge Workers—File and Folder Management, Aug. 8, 2001, http://www.microsoft.com/japan/technet/prodtechnol/winxppro/evaluate/usbltyxp.asp#d and http://www.microsoft.com/technet/prodtechnol/winxppro/evaluate/usbltyxp.mspx#EGAA.

"About ToolTip Controls," © 2005, http://msdn.microsoft.com/library/default.asp?url=/library/en-us/shellcc/platform/commctls/tooltip/tooltip.asp.

Canon Utilities—Zoom Browser EX 5.0, © 2004, http://www.canon.co.jp/Imaging/software/zbex5-j/htm1/02_1.html.

Chinese Office Action dated Oct. 12, 2007, regarding Appl. No. 2005100887336, together with its English translation.

Japanese Official Communication dated Oct. 12, 2007, regarding Appl. No. 2004-221951.

Japanese Official Communication dated Jul. 24, 2009, regarding Appl. No. 2004-255774.

* cited by examiner

F I G. 19
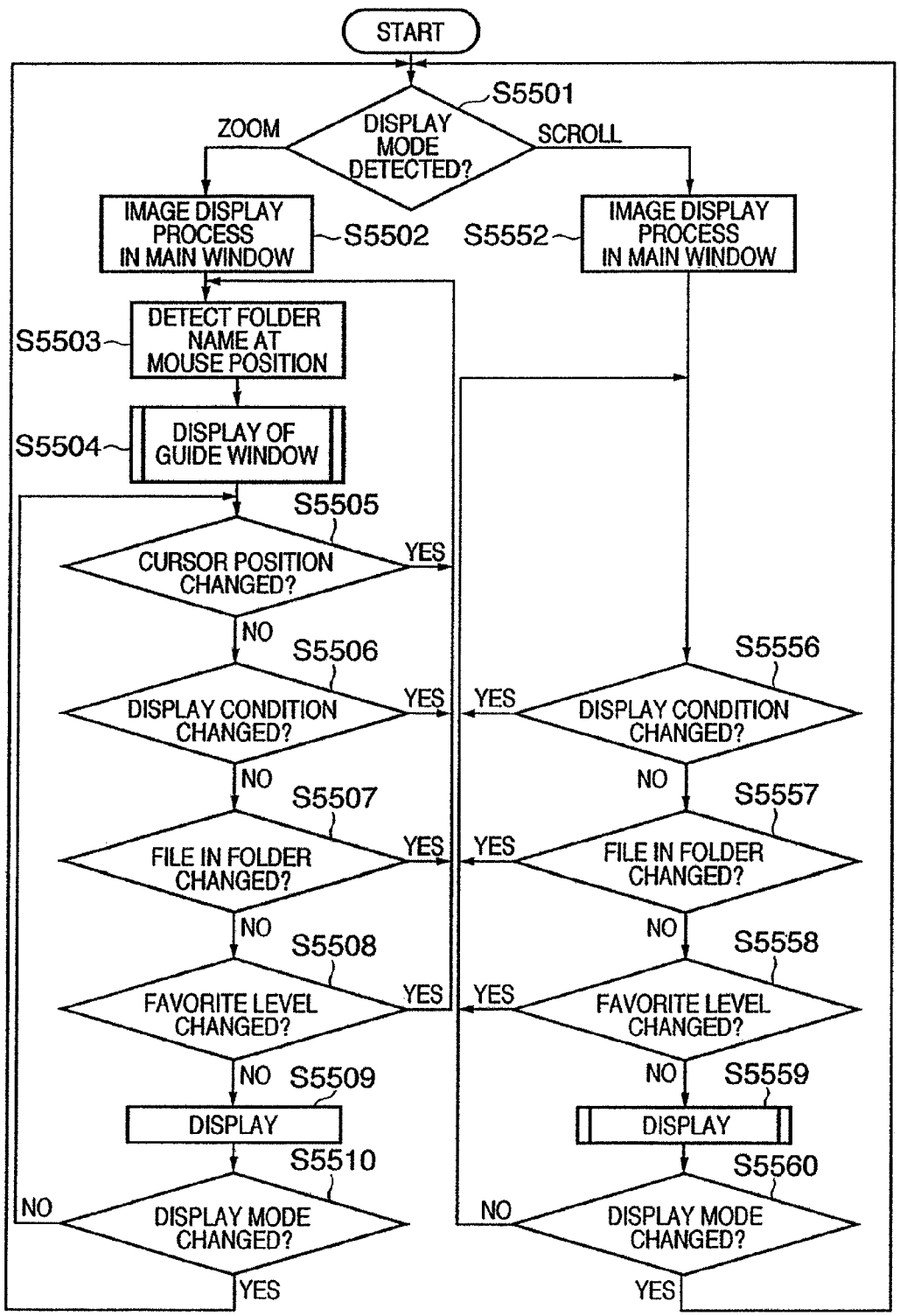

IMAGE PROCESSING APPARATUS AND IMAGE PROCESSING METHOD USING IMAGE ATTRIBUTE INFORMATION AND THUMBNAIL DISPLAYS FOR DISPLAY CONTROL

FIELD OF THE INVENTION

The present invention relates to a technique of facilitating information management of a folder, file, and the like.

BACKGROUND OF THE INVENTION

With recent spread of digital cameras and recent broadband networking of the Internet, the user can easily acquire many images by, for example, capturing an image from a digital camera, receiving an image attached to E-mail from his friend, and downloading a still picture or moving picture from a Web page. Thus, the user must manage many images.

FIG. 10 shows a display example of an information management window in a conventional system. By designating a folder in a tree view 101, the thumbnails of files in the folder can be displayed. Reference numeral 102 denotes a pull-down menu which can switch the display mode; and 103, a slide bar which can switch the thumbnail display size. If thumbnail images exist in an image file or another file, image management software uses them for display; if no thumbnail image exists, creates thumbnails from original images and displays a list of the thumbnails in a browser window (to be referred to as a BW hereinafter) 104. Reference numerals 105 denote buttons ("minimize", "maximize", and "close" from the left) which are normally installed and used to control an application window display.

When many images exist in the folder, as shown in FIG. 10, a scroll bar 106 is displayed beside the BW 104. By scrolling the window with the scroll bar, the user must confirm images of the BW 104 which cannot be confirmed with the screen. At this time, in order to give importance on presenting images as many as possible to the user, images may be reduced at the same magnification and displayed as shown in FIG. 11 or 12, instead of displaying thumbnail images at a fixed size. By this reduction display operation, the user can confirm a larger number of images at once. In reduction display, the user may manually reduce the display size to one as shown in FIG. 11 by using a slide bar 203 for adjusting the display size. Alternatively, the display mode may be switched on a pull-down menu 302 to automatically reduce and display images by software so as to display images as many as possible, as shown in FIG. 12.

By reducing the image size and displaying images in the above-described way, many images can be confirmed at once, and the list property is improved. However, if a displayed image decreases to a predetermined size or less, it becomes difficult to confirm the contents of the image. As a conventional coping method, the user can select one of two means "to manually cancel the automatic enlargement/reduction function" and "to open a viewer which allows confirming an original image".

The method "to manually cancel the automatic enlargement/reduction function" is a process of returning the display in FIG. 11 or 12 to one in FIG. 10. Respective images increase in size, and ease of confirming images improves, but enlargement changes an image layout which has been presented. This will be easily understood considering switching from the display in FIG. 11 to that in FIG. 10. This method is suitable for confirming a single image or a few images. To confirm a plurality of images, a target image must be searched for because the layout which has been checked is lost. In the above-described example, as the number of images to be confirmed becomes larger, the search range becomes larger, and the burden on the user becomes heavier. This method impairs the merit of listing.

The method "to open a viewer which allows confirming an original image" provides a merit of reliably confirming an original image. However, even when the same window is switched, as shown in FIG. 13, or when the viewer is opened in another window, as shown in FIG. 14, the user who wants to easily confirm an image must execute a redundant operation such as switching of the window display from the viewer mode to the original mode in a pull-down menu 402 after confirmation, closing of another window 506 which displays an original window after confirmation, or switching of the window. In displaying an original image by the viewer, the user must wait for a process time for displaying an original image that is longer than a process time of displaying a thumbnail.

Display devices which list and display images in a folder by classifying images stored in a storage device into folders have become popular. In order to efficiently search many images for a necessary image, there is proposed a display device which designates a condition for images to be displayed, and lists and displays (filters and displays) only images having a specific property.

For example, Adobe Photoshop Album® available from Adobe Systems has a function of adding a "tag" to an image and displaying only images having a specific tag (see "'Photoshop Album' Classify By Adding Tag", [online], [searched Sep. 1, 2004], Internet <URL: http://www.adobe.co.jp/products/photoshopalbum/overview/page2.html#2_4>). In order to easily know the type of image recorded in each folder when many folders exist, there is also proposed a folder content outline display means which reduces and displays only a predetermined number of images in a folder as an outline of the folder.

For example, Windows XP® available from Microsoft provides a function of displaying, on a folder icon, the thumbnails of some images contained in a folder by using a "reduced" view (see "'Usability Improvements in Windows XP for Knowledge Workers' File and Folder Management", [online], [searched Sep. 1, 2004], Internet <URL: http://www.microsoft.com/japan/technet/prodtechnol/winxppro/evaluate/usbltyxp.asp#d).

This function displays schematic contents of only a designated folder when a folder is designated, or automatically displays schematic contents at a location near a folder name without specially designating one of a plurality of folders.

Schematic contents of a folder are conventionally acquired in an order from the first image in the folder or in a designated order, and images are reduced and created in order until the number of images reaches a predetermined value. When this technique and filtering display are adopted at the same time, an image which is designated by filtering so as not to be displayed is displayed in schematic contents of the folder.

SUMMARY OF THE INVENTION

The present invention has been made to overcome the conventional drawbacks, and has as its object to provide a technique of facilitating management of a folder and file.

The present invention has been made to overcome the conventional drawbacks, and has as its object to provide a technique of listing and displaying only designated images out of images held in a folder.

In order to achieve an object of the present invention, for example, an information management apparatus of the present invention comprises the following arrangement.

That is, an information management apparatus comprising:

determination means for determining a type of information designated by input means; and display control means for controlling, in accordance with the type of information determined by the determination means, a display form of an information presentation portion presenting explanatory information on the designated information.

In order to achieve an object of the present invention, for example, an information presentation method of the present invention comprises the following arrangement.

That is, an information presentation method of displaying explanatory information on information designated by input means, comprising:

a determination step of determining a type of information designated by the input means; and a display control step of controlling, in accordance with the type of information determined in the determination step, a display form of an information presentation portion presenting explanatory information on the designated information.

In order to achieve an object of the present invention, for example, an information processing apparatus of the present invention comprises the following arrangement.

That is, an image processing apparatus comprising:

storage means for storing at least one image in a folder;

first setting means for setting an index for each of the at least one image;

second setting means for setting a display condition; and display means for reducing, of the at least one image, images having indices which satisfy the display condition set by the second setting means, and listing and displaying the reduced images together with an icon representing the folder.

In order to achieve an object of the present invention, for example, an information processing method of the present invention comprises the following arrangement.

That is, an image processing method comprising:

a storage step of storing at least one image in a folder;

a first setting step of setting an index for each of the at least one image;

a second setting step of setting a display condition; and a display step of reducing, of the at least one image, images having indices which satisfy the display condition set in the second setting step, and listing and displaying the reduced images together with an icon representing the folder.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 19 is a flowchart showing a process of listing and displaying images saved in each folder;

DETAILED DESCRIPTION OF THE PREFERRED EMBODIMENTS

Preferred embodiments of the present invention will now be described in detail in accordance with the accompanying drawings.

The following embodiments are merely examples of a means for implementing the present invention, and should be properly modified or changed in accordance with the arrangement and various conditions of an apparatus to which the present invention is applied. The present invention is not limited to the following embodiments.

The present invention is also achieved when a storage medium (or recording medium) which stores software program codes for realizing the display control function of an information tool tip according to the following embodiments is supplied to a system or apparatus, and the computer (or the CPU or MPU) of the system or apparatus reads out and executes the program codes stored in the storage medium.

First Embodiment

[System Configuration]

Figure 1:
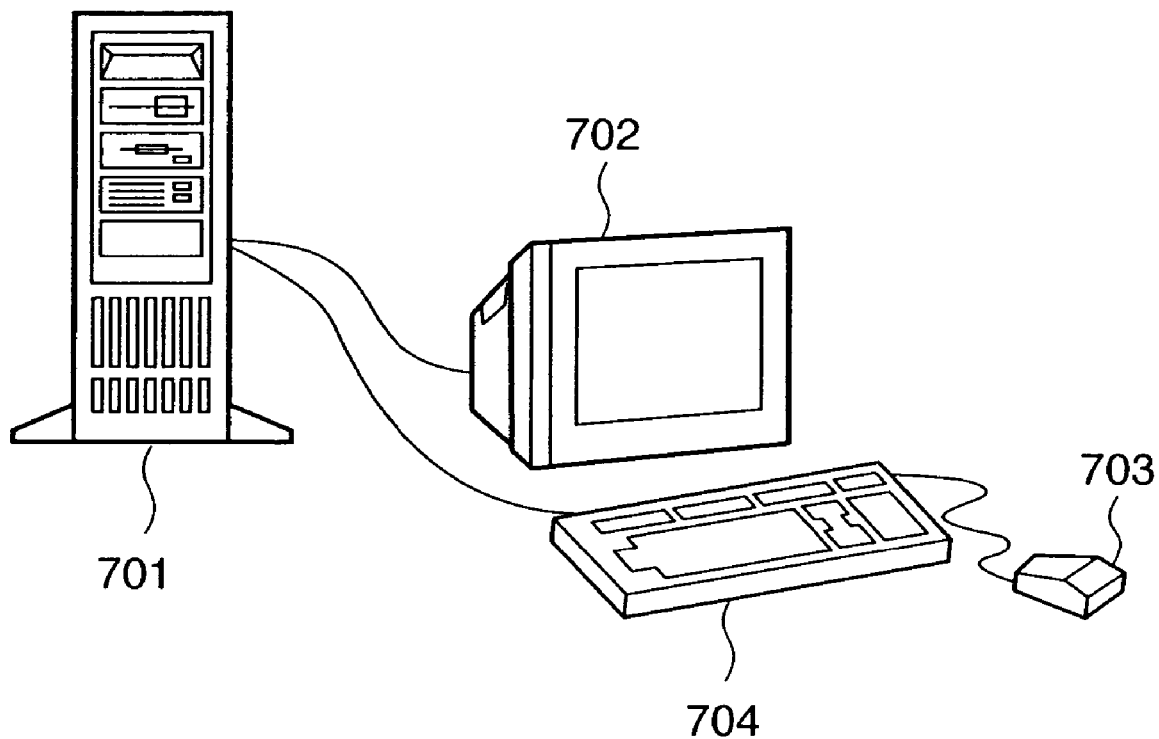
FIG. 1 is a view showing an example of the configuration of a computer system as a platform which can implement an information management apparatus according to the present invention.

FIG. 1 shows an example of the configuration of a computer system as a platform which can implement an information management apparatus according to the present invention. In FIG. 1, reference numeral 701 denotes a PC (Personal Computer) main body; 702, a display which displays data; 703, a mouse as a typical pointing device; and 704, a keyboard.

Figure 2:
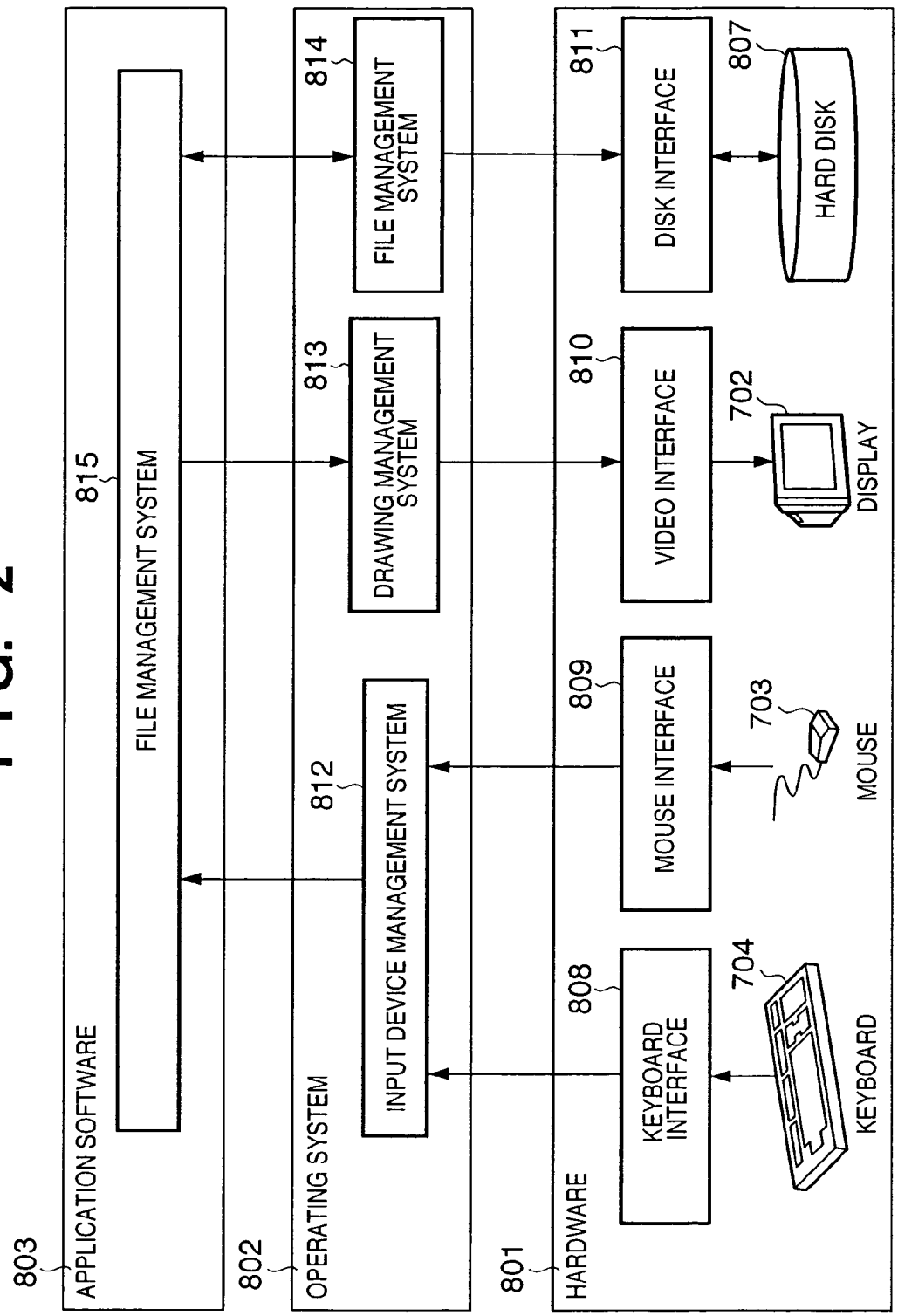
FIG. 2 is a view showing the whole arrangement of the information management apparatus including software and hardware according to the first embodiment of the present invention.

FIG. 2 is a view showing the whole arrangement of the information management apparatus including software and hardware according to the first embodiment of the present invention.

In FIG. 2, reference numeral 801 denotes hardware; 802, an OS (Operating System) which runs on the hardware 801; and 803, application software which runs on the OS 802. Of blocks which constitute the hardware 801 and OS 802, functional blocks which are naturally contained as components but are not necessary for describing the embodiment of the present invention will not be illustrated. Examples of unillustrated blocks are a CPU and memory for hardware, and a memory management system for the OS.

In FIG. 2, reference numeral 807 denotes a hard disk which physically stores files and data; and 814, a file system which forms the OS and has a function of allowing application software to input/output a file without any consciousness of hardware. Reference numeral 811 denotes a disk I/O interface which is used by the file system 814 for read/write from/in the hard disk 807. Reference numeral 813 denotes a drawing management system which forms the OS and has a function of allowing application software to perform drawing without any consciousness of hardware. Reference numeral 810 denotes a video interface which is used by the drawing system 813 to perform drawing on the display 702. Reference numeral 812 denotes an input device management system which forms the OS and has a function of allowing application software to receive an input from the user without any consciousness of hardware. Reference numeral 808 denotes a keyboard interface for receiving an input from the keyboard 704 by the input device management system 812; and 809, a mouse interface for receiving an input from the mouse 703 by the input device management system 812.

Figure 11:
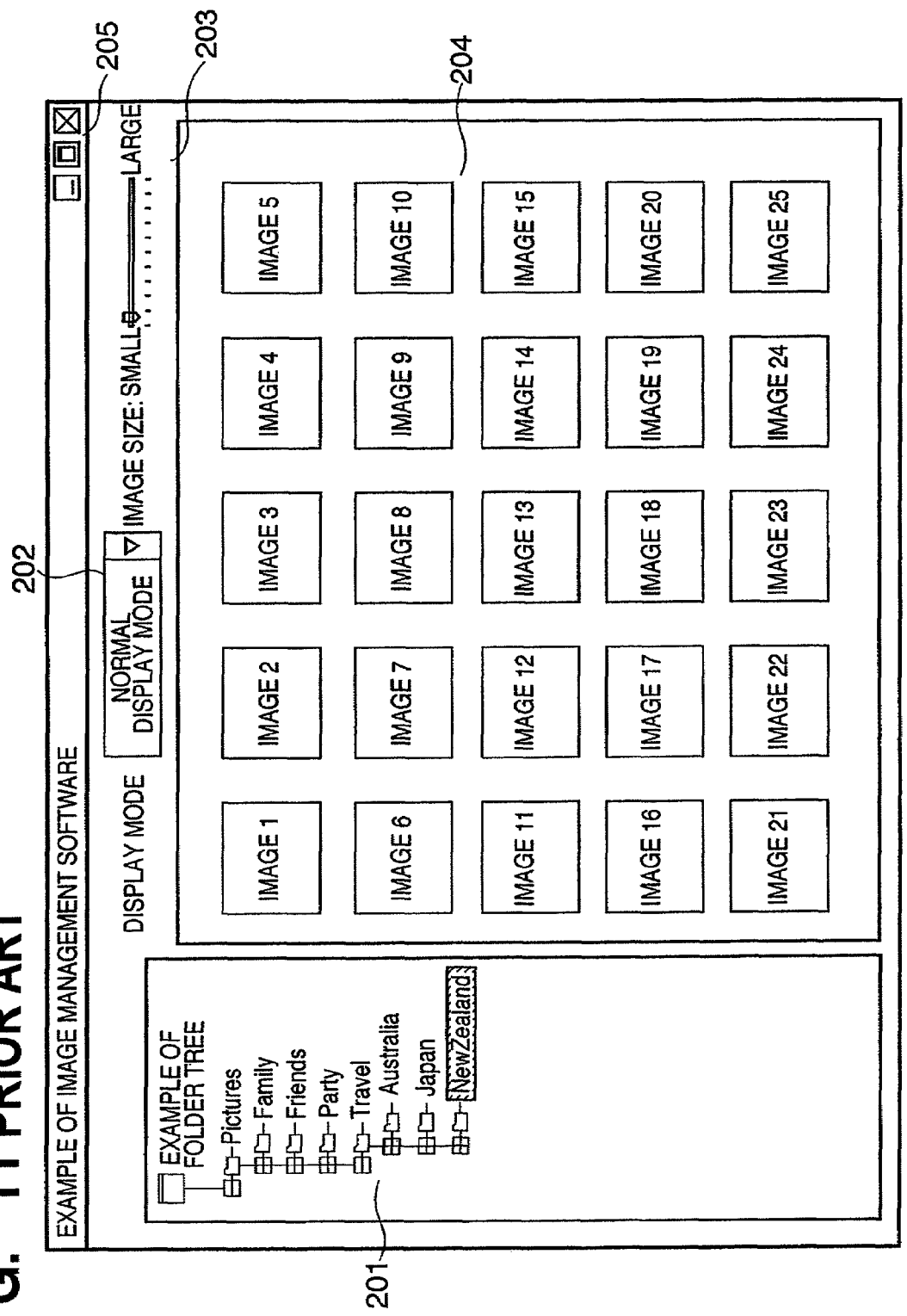
FIG. 11 is a view showing a display example of information when the display size is manually reduced.
Figure 12:
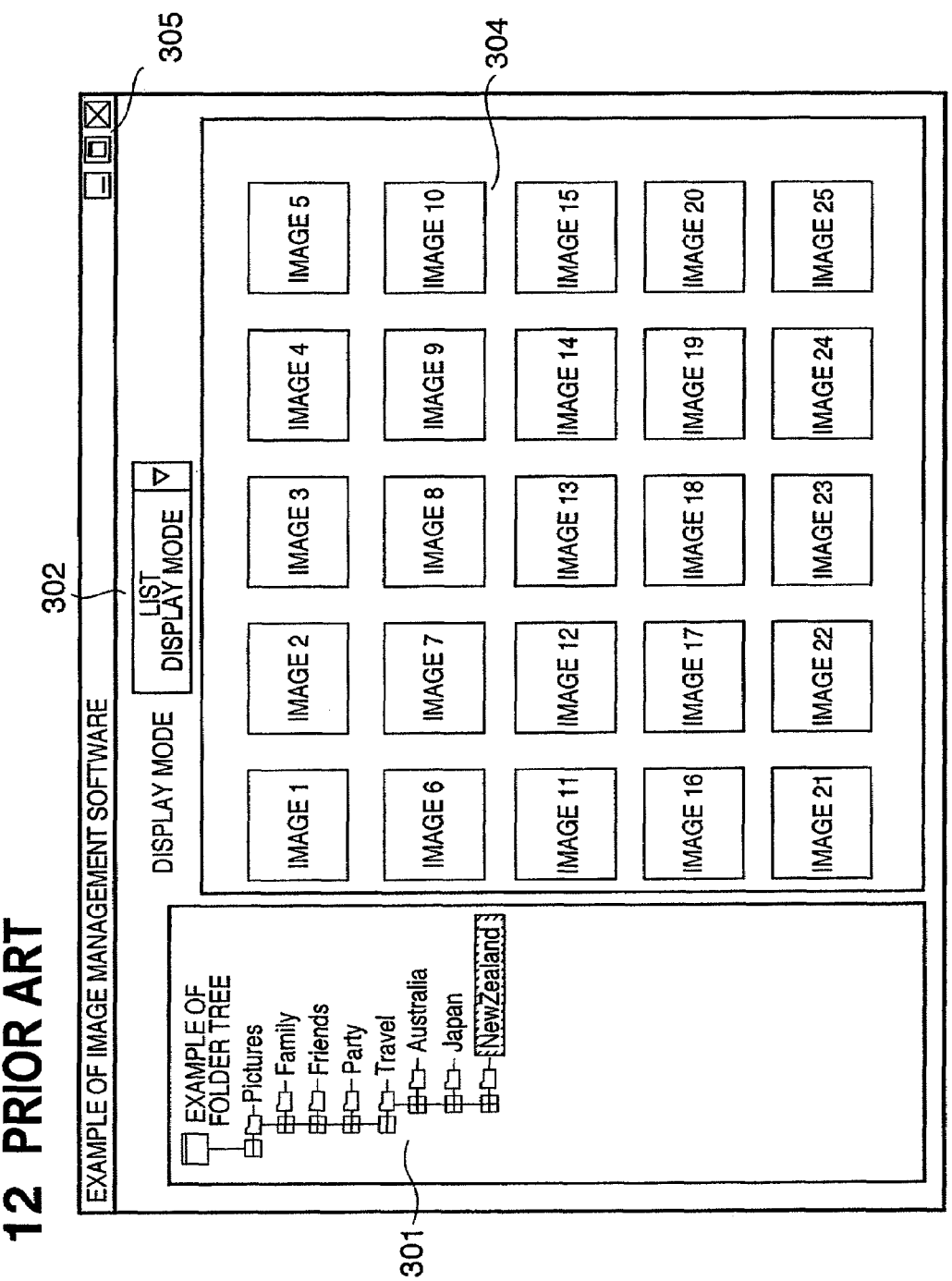
FIG. 12 is a view showing a display example when information is automatically reduced and displayed in a list display mode.
Figure 13:
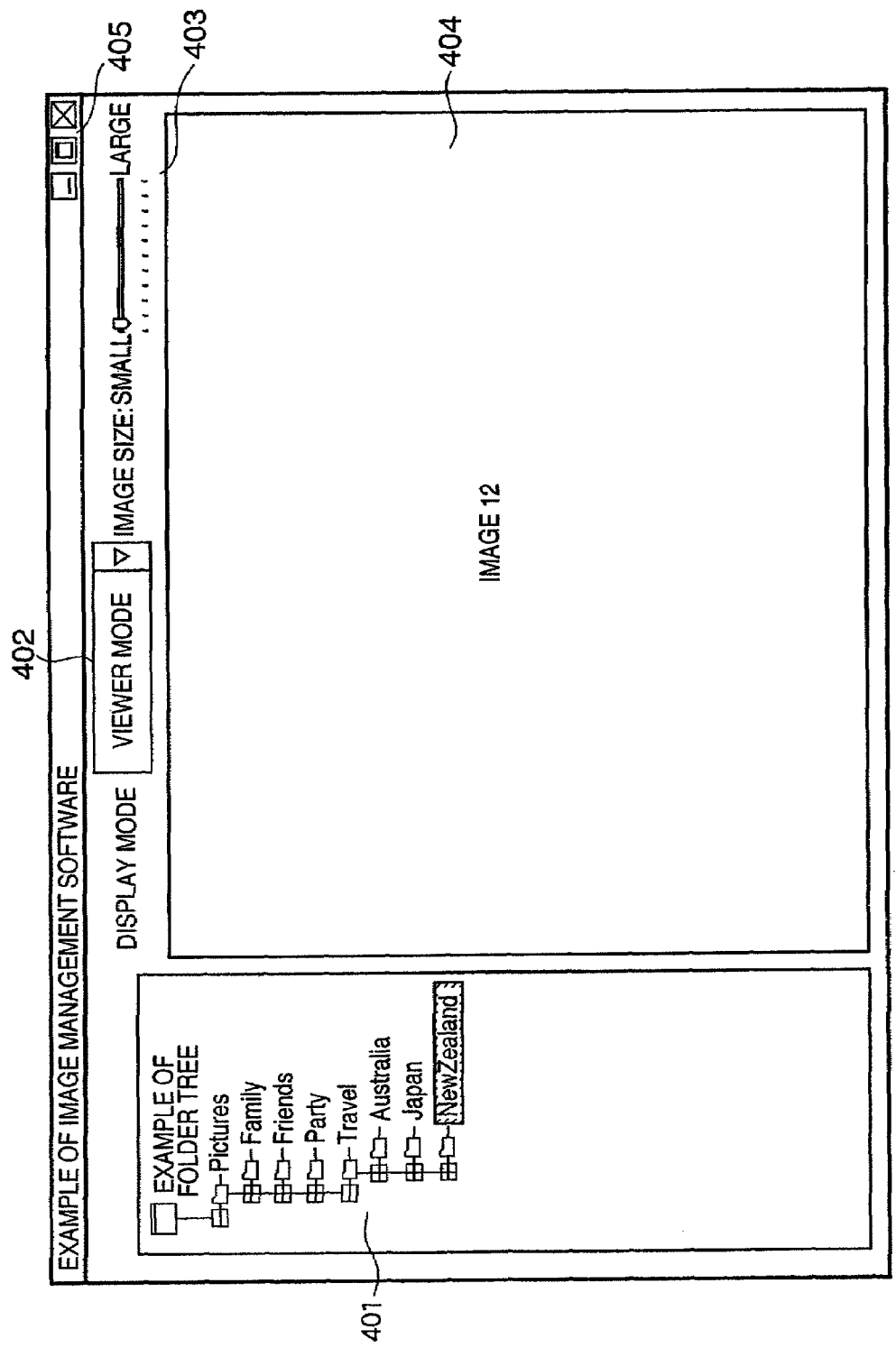
FIG. 13 is a view showing a display example for confirming an image in a viewer mode.
Figure 14:
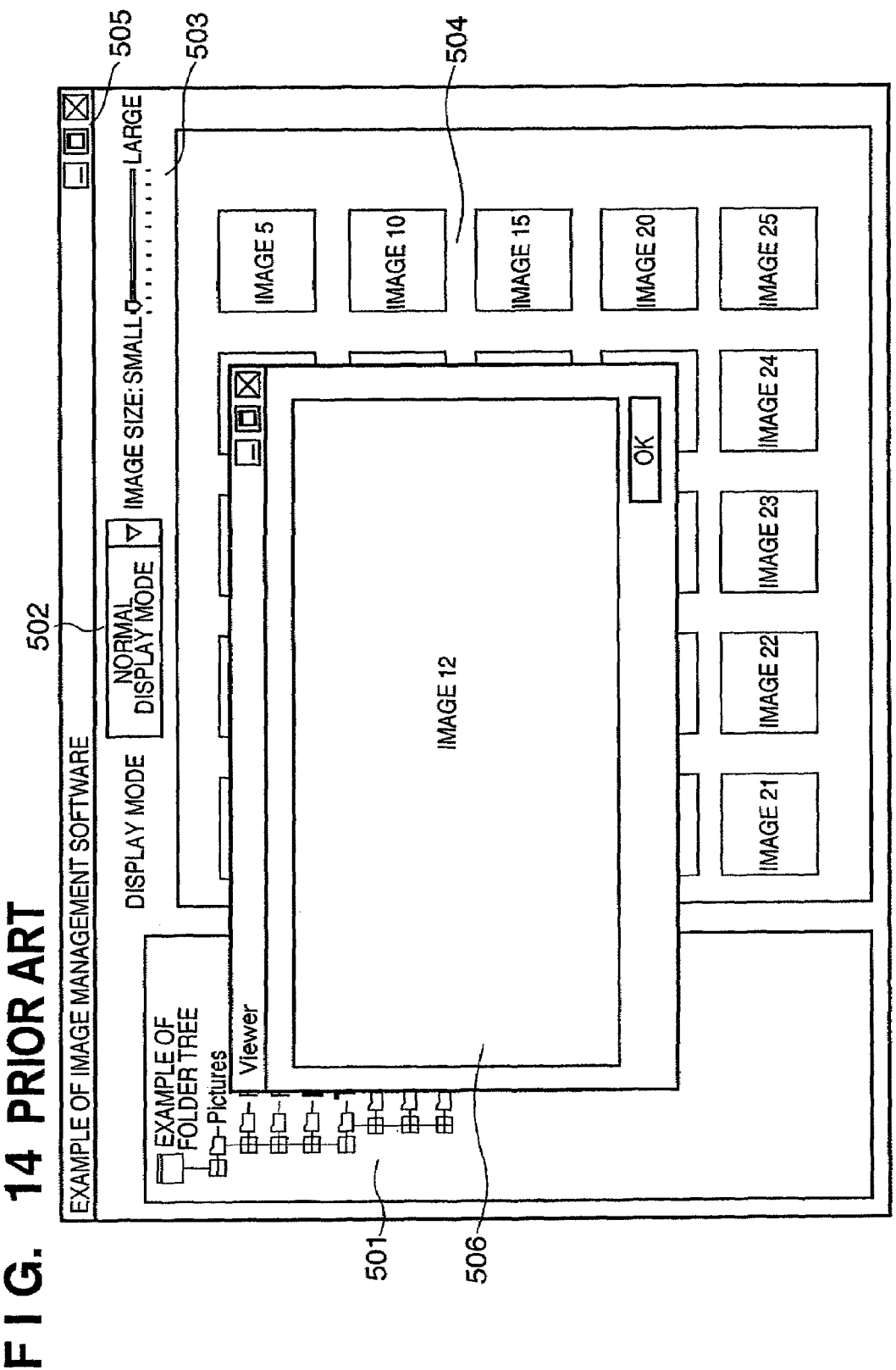
FIG. 14 is a view showing a display example when the viewer is opened in another window.

The first embodiment will be explained by exemplifying a display process in FIG. 3 that gives the largest effect of the present invention. The present invention is also suitable for a list display process in FIGS. 11 and 12.

Figure 3:
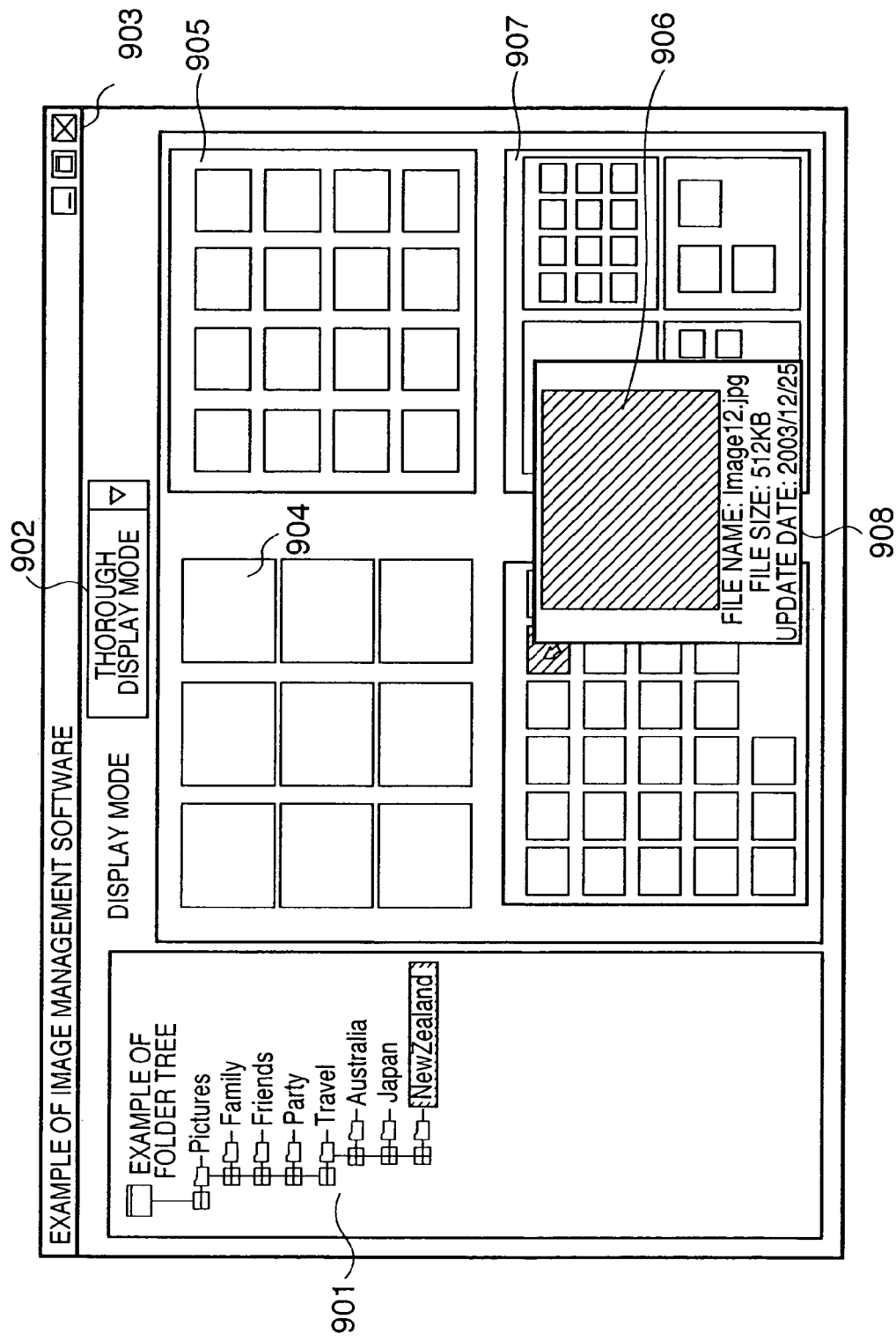
FIG. 3 is a view showing a display example of an information tool tip when information in a folder is thoroughly displayed.

In FIG. 3, a folder in a tree view 901 can be designated to display the thumbnails of files in the folder. The display process in FIG. 3 is different from that in FIGS. 11 and 12 in that files in a designated folder and subfolders are thoroughly displayed. In the display process of FIGS. 11 and 12, only files in a designated folder can be browsed. In the thorough display process of FIG. 3, even files in subfolders can be browsed.

More specifically, in FIG. 3, unframed files 904 are files in a designated folder. Reference numeral 905 denotes a frame which represents a subfolder subsidiary to a designated folder. Framed files are image files in a folder on a layer lower by one than the folder designated at the tree view 901. Similarly, reference numeral 907 denotes a frame which represents a folder on a layer lower by one from the folder on the lower layer. That is, files displayed within the frame 907 are files on a layer lower by two from the folder designated at the tree view 901. By repeating such display, a process of thoroughly displaying files in a designated folder and subfolders is realized.

The largest advantage of the display process is that the user can see all files in a designated folder and subfolders. At the same time, the display process has a disadvantage of displaying, at a very small size, images when one folder has many images, and files in a folder on a layer lower by several levels, like files in the folder 907.

To solve this problem, according to the first embodiment, an information tool tip (explanatory information display portion) assigned with the thumbnail of an image is displayed by performing a specific operation on a file/folder displayed in the browser window.

To display information of an image file, the thumbnail of an image and information (e.g., file name, file size, and file update date & time) unique to the image are displayed, like an information tool tip 906. If the image file holds more detailed information such as photographing information, the information is simultaneously displayed.

Figure 7:
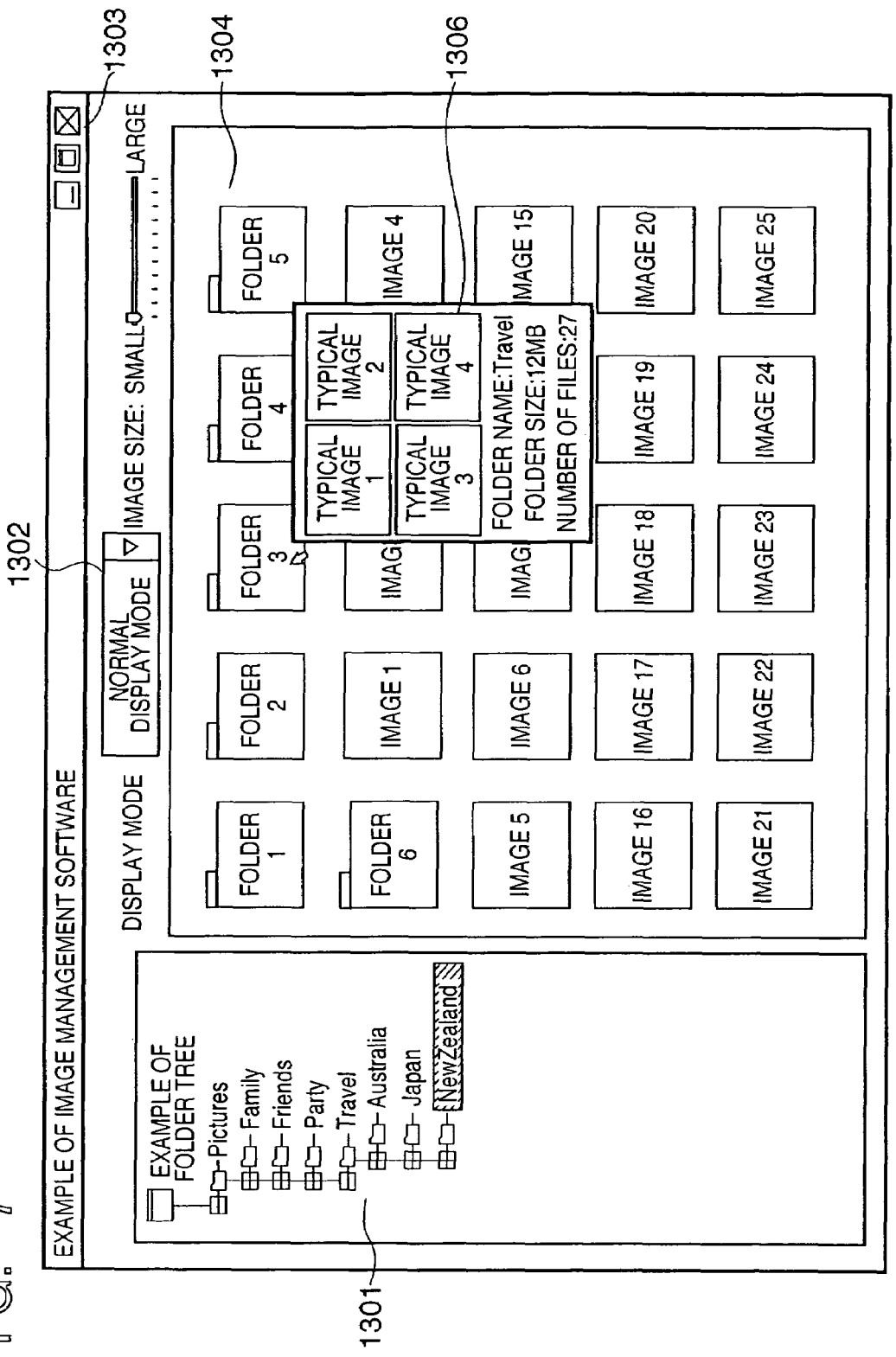
FIG. 7 is a view showing an example of displaying information in a folder by an information tool tip.

To display information of a folder, N typical images in the folder are displayed at maximum, as illustrated in FIG. 7. In FIG. 7, N=4. Reference numeral 1306 denotes an information tool tip when folder information is displayed. The folder information is displayed together with its four typical images. For example, the information includes a folder name, folder size, and the total number of images in the folder. When the folder holds only three images or less, a blank is inserted and displayed together.

A thumbnail is displayed in the BW in two cases: "a thumbnail is displayed by reflecting rotation information" and "a thumbnail is displayed while rotation information is ignored". In the former case, a photographing state can be accurately displayed, but the thumbnail display speed decreases because a thumbnail is displayed after rotation. This demerit becomes serious when a folder has many images to be rotated. To prevent this, importance is given to the thumbnail display speed in BW display, and a thumbnail is displayed in the latter case. To confirm a thumbnail after rotation when it is displayed in the latter case, the thumbnail at the tool tip is displayed by reflecting rotation information, and the state after rotation can be easily confirmed without any rotation operation.

The definitions of "information tool tip" and "specific operation" in the first embodiment will be explained.

In this specification, a tool tip means a function of automatically displaying the contents of a button of a tool bar when the mouse cursor is moved over the button.

At present, an application often utilizes the tool tip as an explanation assistant function based on a text. For example, when the mouse is moved over a button of an application, the explanation of the function of the button is displayed, and when the mouse is moved over a file, the type of file, update date and time, and the like are displayed by a text.

To the contrary, the tool tip according to the present invention has a function of displaying the thumbnail of an image in addition to an explanation by a text. Further, the tool tip has a characteristic function of presenting a proper display when the mouse is moved over a folder, still picture, or moving picture.

The tool tip has a characteristic function of performing display/non-display (ON/OFF) of the thumbnail of the tool tip or regenerating a thumbnail to be displayed by the tool tip in accordance with the thumbnail display size in a browser window.

In the following description, a tool tip according to the first embodiment will be called an "information tool tip (information presentation portion)" in order to discriminate a conventional tool tip and a tool tip according to the present invention.

More specifically, according to the first embodiment, the thumbnail of a file/folder corresponding to the mouse position, and information 908 held by the file/folder are displayed at the information tool tip 906 shown in FIG. 3. Unlike a normal window, the information tool tip is not equipped with any functions such as "minimize", "maximize", and "close" buttons 903. The information tool tip is closed by a specific operation corresponding to a method of displaying the information tool tip (for example, when the information tool tip is displayed upon mouse-over, operation of moving the mouse in a predetermined section, or when the information tool tip is displayed by pressing a specific key, operation of pressing again or releasing the specific key).

The display size of the information tool tip depends on the thumbnail size or text information of an image displayed within the tool tip. The display position of the information tool tip depends on the mouse pointer, unlike a normal window, and the information tool tip is displayed so that, for example, its upper left portion is located at a lower right portion from a position indicated by the mouse pointer. If the information tool tip extends off the display, the tool tip is displayed at a position which satisfies a condition that the entire tool tip is displayed and the outer frame of the tool tip overlaps a position indicated by the mouse pointer. Alternatively, the information tool tip may be displayed at a position designated by the user or a program in advance. When the information tool tip is always displayed at a predefined portion, the user suffices to confirm the area after mouse-over in order to confirm information.

A specific operation corresponds to mouse operation (mouse-over, click, or dragging) or keyboard operation, and in the first embodiment, the information tool tip is displayed upon mouse-over. However, in a case in which the information tool tip is displayed upon mouse-over, the information tool tip is displayed when it need not be displayed. Thus, the present invention also includes a method of displaying the tool tip only during dragging and a method of displaying the tool tip while the shift key is pressed upon mouse-over.

Figure 4:
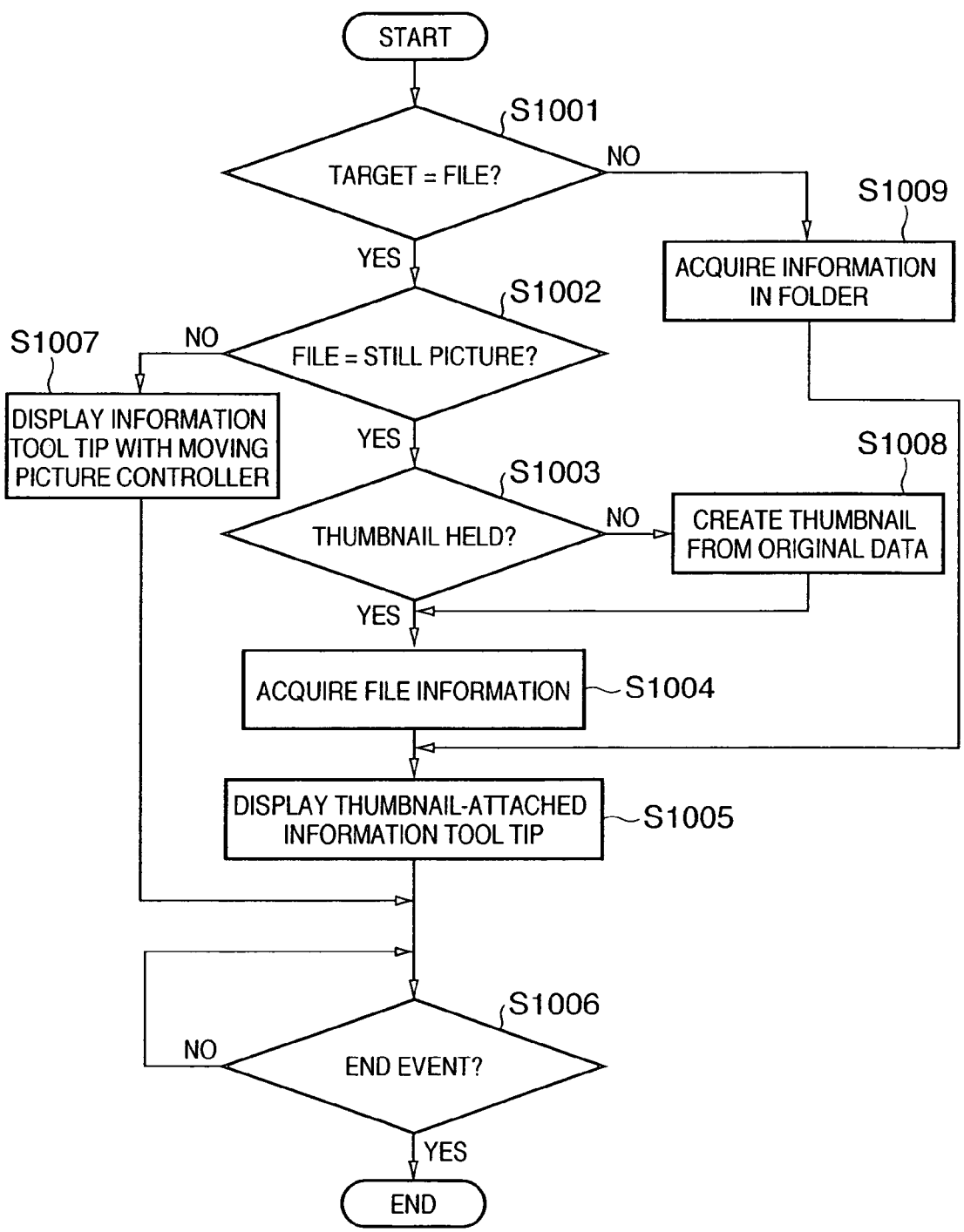
FIG. 4 is a flowchart showing an information tool tip display process according to the first embodiment.

FIG. 4 is a flowchart showing an information tool tip display process according to the first embodiment.

Figure 9:
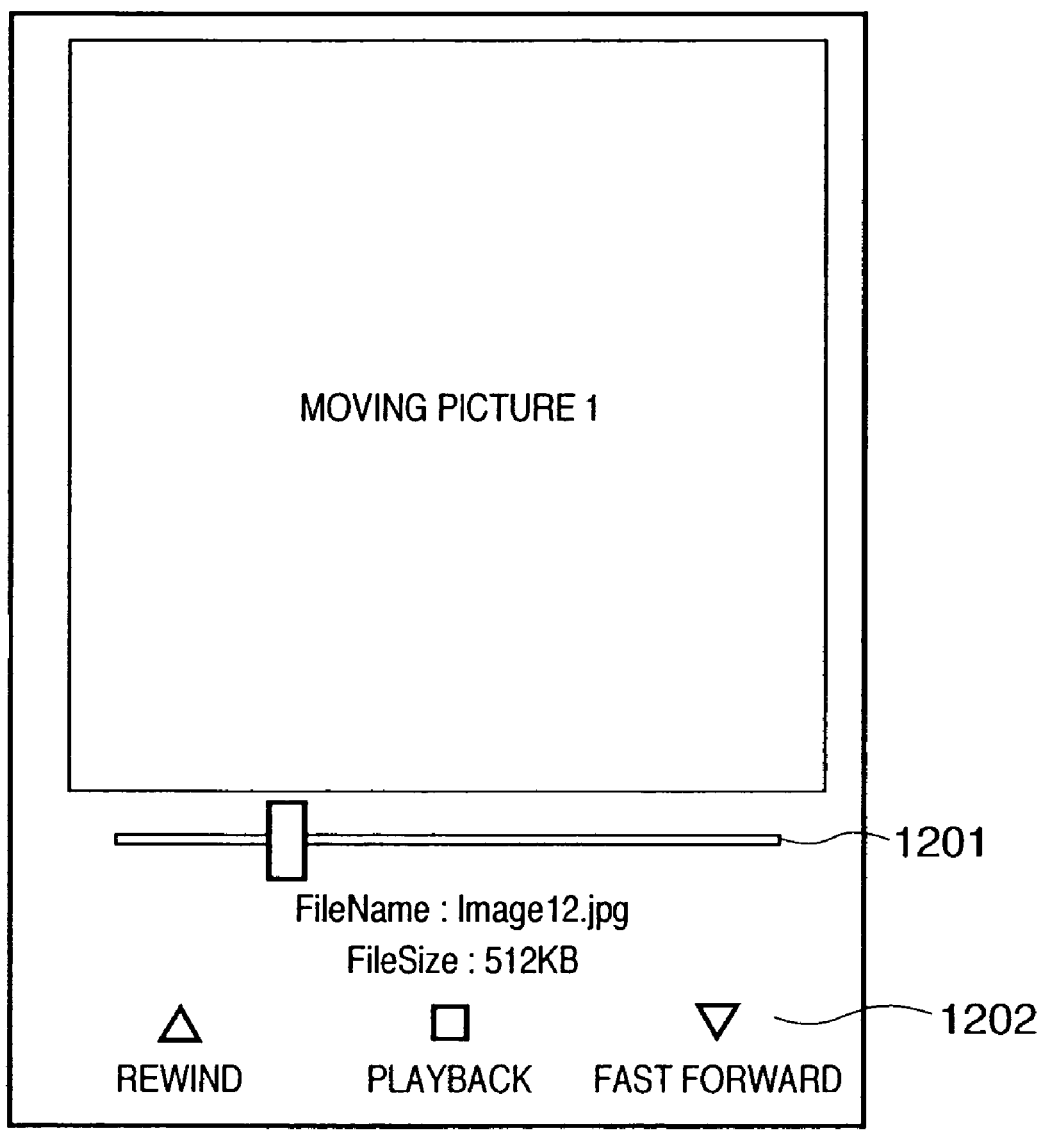
FIG. 9 is a view showing a display example of an information tool tip having a moving picture operation controller.
Figure 10:
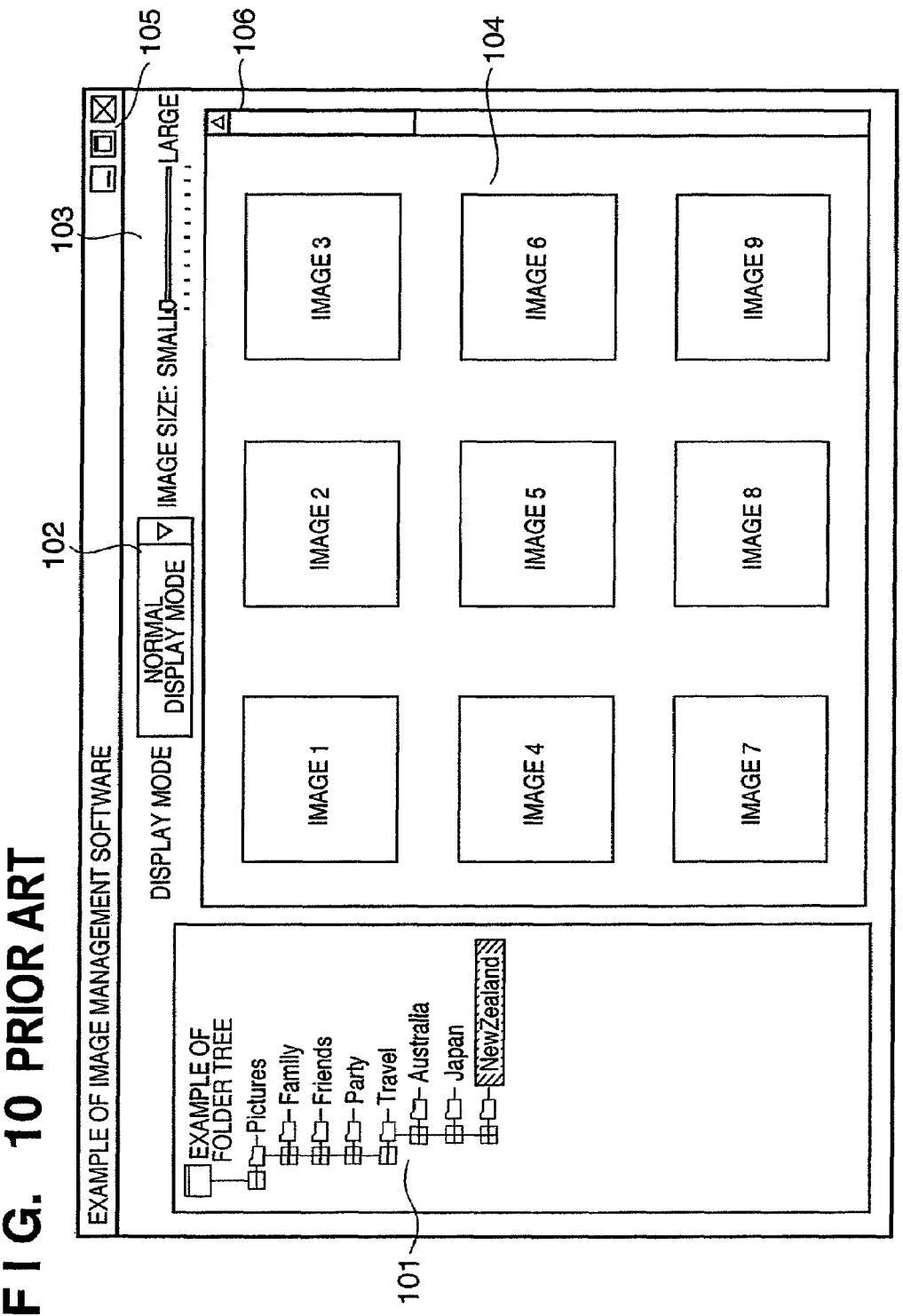
FIG. 10 is a view showing a display example of information by a conventional information management apparatus.

In FIG. 4, when a mouse-over event occurs, an object indicated by the mouse pointer is determined in S1001. If the object is a file, the flow advances to S1002 to determine whether the file is a still or moving picture. If the file is a still picture, it is determined in S1003 whether the file has a thumbnail. If NO in S1003, the flow advances to S1008 to perform a process of creating a thumbnail from the original image data and saving the thumbnail in another file or embedding it in the original file in order to use the thumbnail in the next display. File information necessary for display is acquired in S1004, and an information tool tip (906 in FIG. 3) is displayed in S1005. If the file is determined in S1002 to be a moving picture, an information tool tip having a moving picture operation controller illustrated in FIG. 9 is displayed in S1007.

If the object is determined in S1001 to be a folder, the folder information is acquired in S1009, and then the flow advances to a process in S1005. In S1005, the thumbnails of a predetermined number of typical images in the folder are simultaneously acquired and displayed as folder thumbnails. By this process, the user can easily grasp the contents of images present in the folder.

If an end event occurs in S1006, the tool tip display process ends. The end event in the first embodiment occurs at the end of mouse-over. The end event changes depending on a start event.

A process in acquiring information in a folder in S1009 will be explained with reference to the flowchart of FIG. 6.

Figure 6:
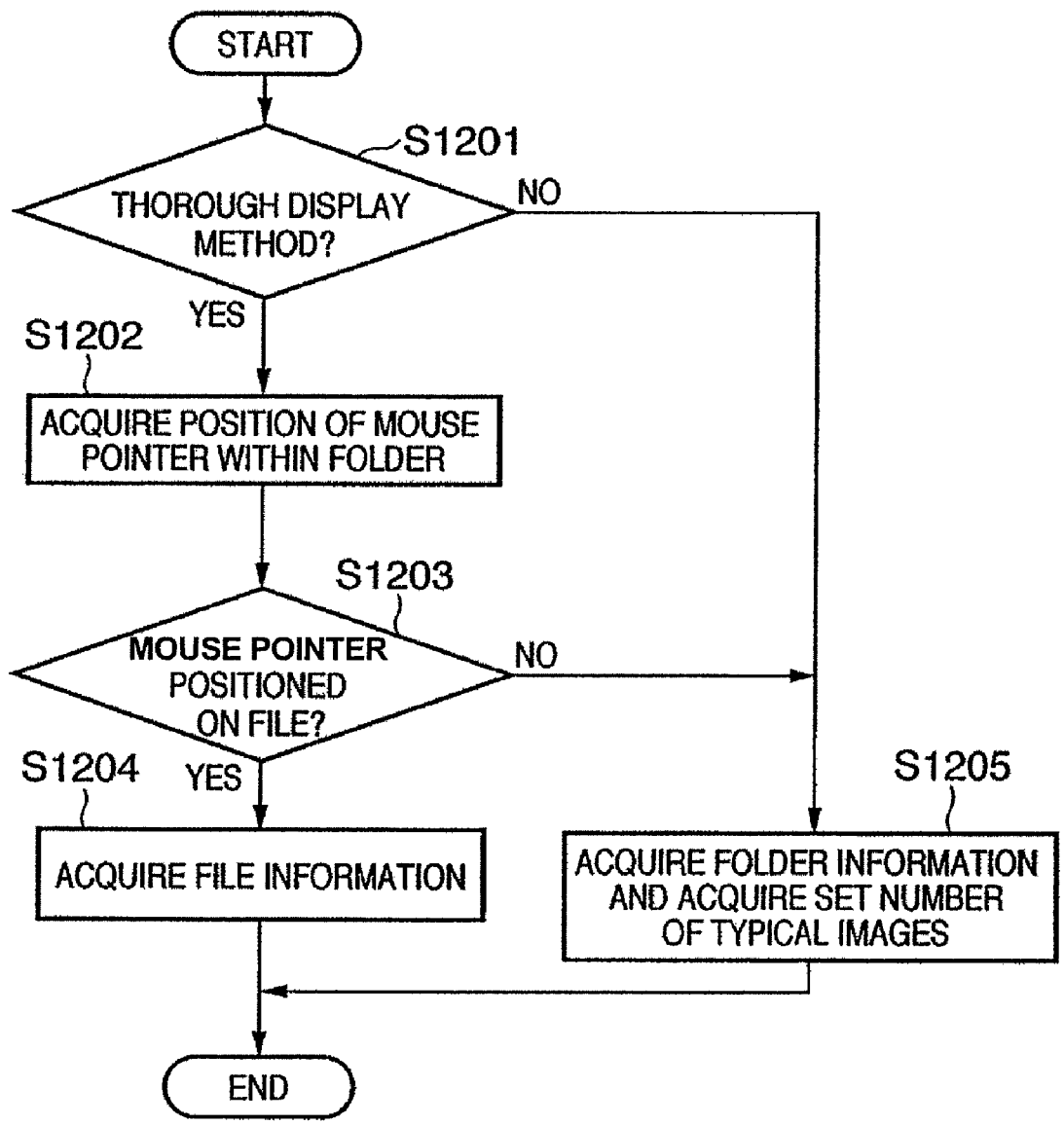
FIG. 6 is a flowchart showing a process in acquiring information in a folder in S1009 of FIG. 4.

In FIG. 6, when a mouse-over event occurs in a folder region, the display mode is confirmed in S1201. If the display mode is not the thorough display mode, a set number of typical images and information such as the folder size are acquired in S1205. By using the information, a folder image information tool tip is displayed in S1005, like the information tool tip 1306 of FIG. 7. If the display mode is set to the thorough display mode in S1201, positional information of the mouse pointer in the folder is acquired in S1202. If the mouse pointer indicates a file in the folder in S1202, the file information is acquired in S1204 (similar to the process in S1004 of FIG. 4). In S1005 of FIG. 4, an information tool tip for the image file is displayed, like the information tool tip 908 of FIG. 3. If the mouse pointer indicates an area other than a file in the folder, the folder information is acquired in S1205, and an information tool tip for the folder is displayed, like an information tool tip 1406 of FIG. 8.

Figure 8:
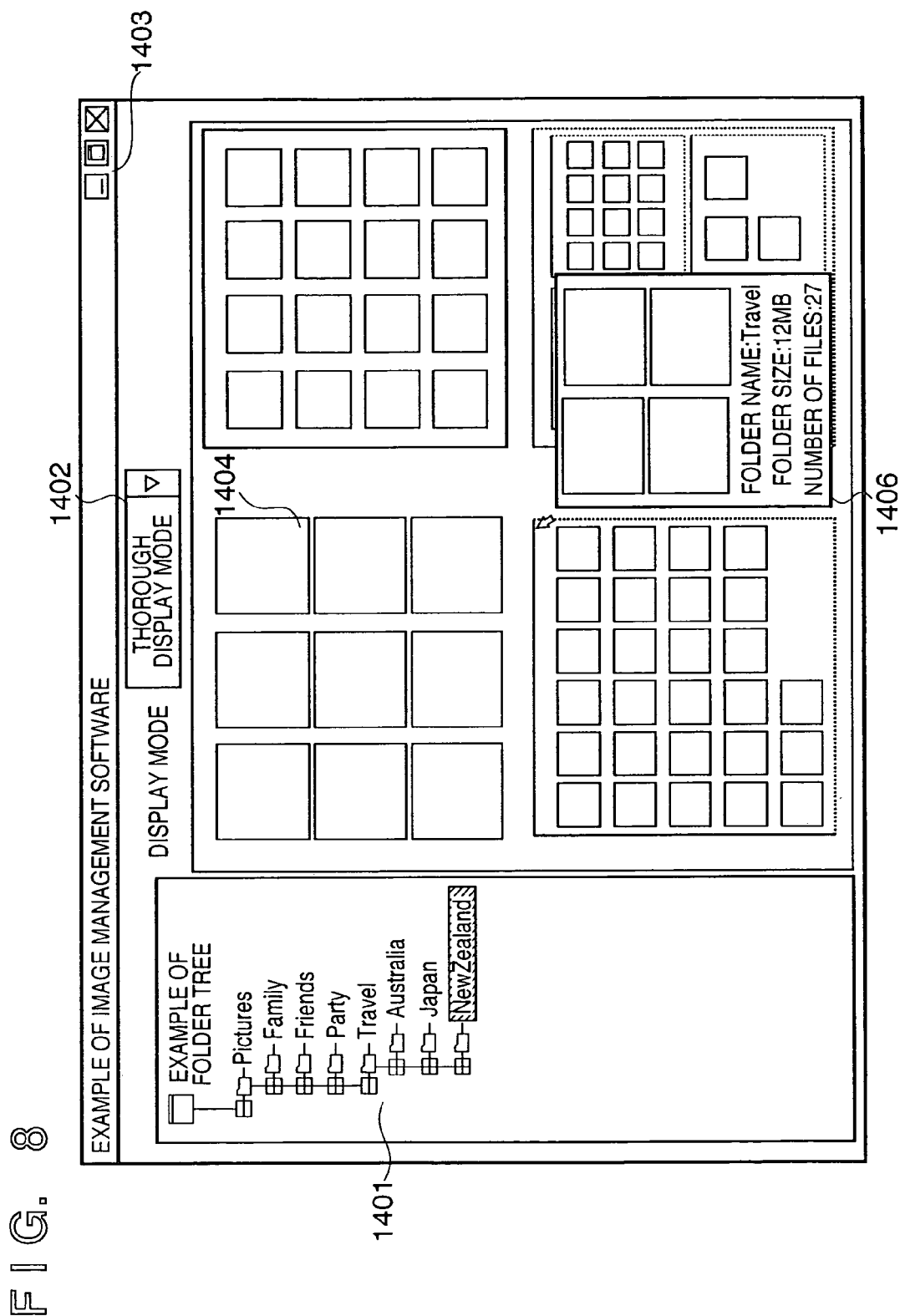
FIG. 8 is a view showing another display example of the information tool tip when information in a folder is thoroughly displayed.
Figure 15:
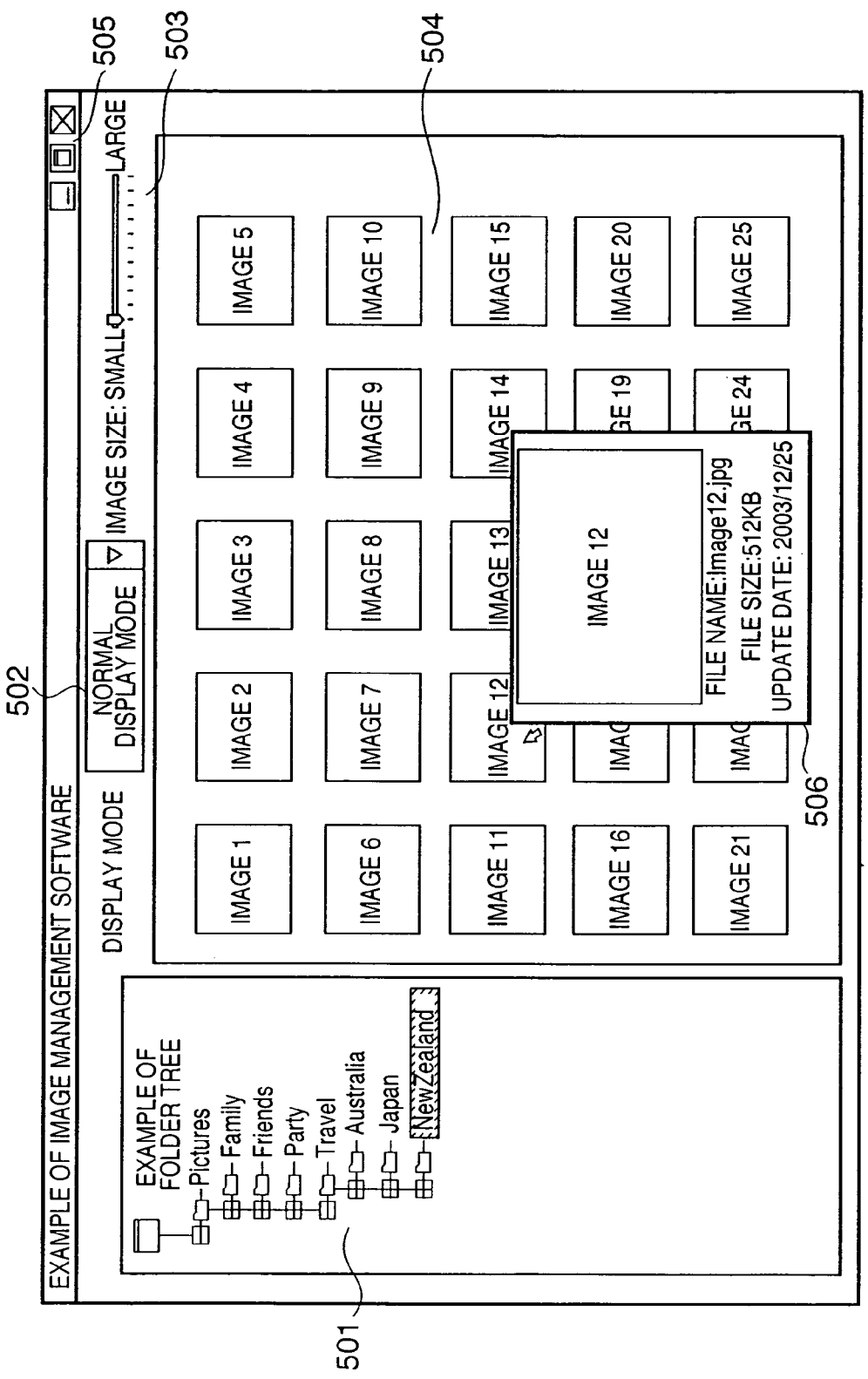
FIG. 15 is a view showing a display example of an information tool tip according to the present invention.

Functions 1301 to 1304 shown in FIG. 7 correspond to 501 to 504 in FIG. 15, and functions 1401 to 1404 shown in FIG. 8 correspond to 901 to 904 in FIG. 3.

When the information tool tip displays the thumbnail of an image, the display size of the browser window (BW) may be larger than the display thumbnail size of the information tool tip. At this time, display of an image smaller than a thumbnail on the BW is insignificant, and a process of displaying only image information is performed.

The user may want to intentionally display an information tool tip because he cannot be satisfied with the size in the BW. As another method, therefore, when the display size in the BW is larger than the size of a thumbnail displayed at the information tool tip, a thumbnail is created again from the original image, and the thumbnail larger than the display size in the BW is displayed. By this process, the user can confirm an image higher in quality than a simply enlarged thumbnail image. In this case, a created thumbnail is saved in another file so as to use and display the thumbnail at a high speed in the next and subsequent displays.

The user can switch the two cases as an option at an arbitrary timing and arbitrarily select either mode, improving convenience.

Figure 5:
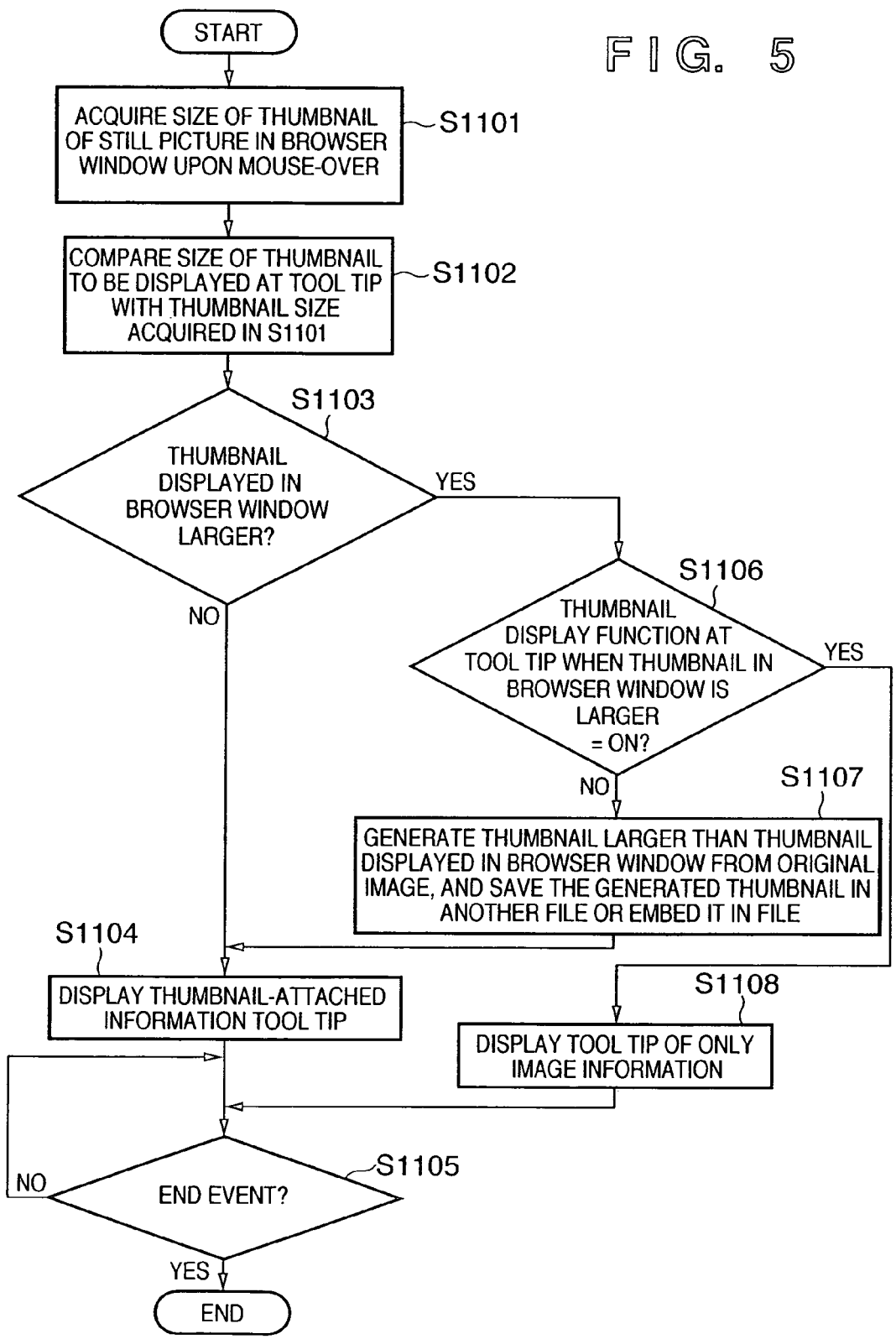
FIG. 5 is a flowchart showing a process of displaying an information tool tip corresponding to the display size in a browser window.

FIG. 5 is a flowchart showing the above-described process of displaying an information tool tip corresponding to the display size in the browser window.

In FIG. 5, the thumbnail size of an image indicated by mouse-over in the browser window is acquired in S1101. In S1102, the size of a thumbnail to be displayed at the tool tip and the thumbnail size acquired in S1101 are compared. If the image displayed in the browser window is smaller than the image to be displayed at the tool tip, the flow advances to S1104 to display the thumbnail-attached information tool tip. If the thumbnail displayed in the browser window is larger in S1103, the ON/OFF state of the function of displaying the thumbnail-attached information tool tip is confirmed in S1106. If the function is set OFF so as not to display any thumbnail-attached information tool tip, an information tool tip having no thumbnail (having only image information) is displayed in S1108. If the function is set ON so as to display a thumbnail-attached information tool tip, a thumbnail image larger than the thumbnail displayed in the browser window is generated from the original image in S1107, and the file is embedded in another file or the original file. The purpose of this process is to display the image at a high speed in the next display. After the end of the process, a thumbnail-attached information tool tip is displayed using the generated image in S1104.

Second Embodiment

Figure 17:
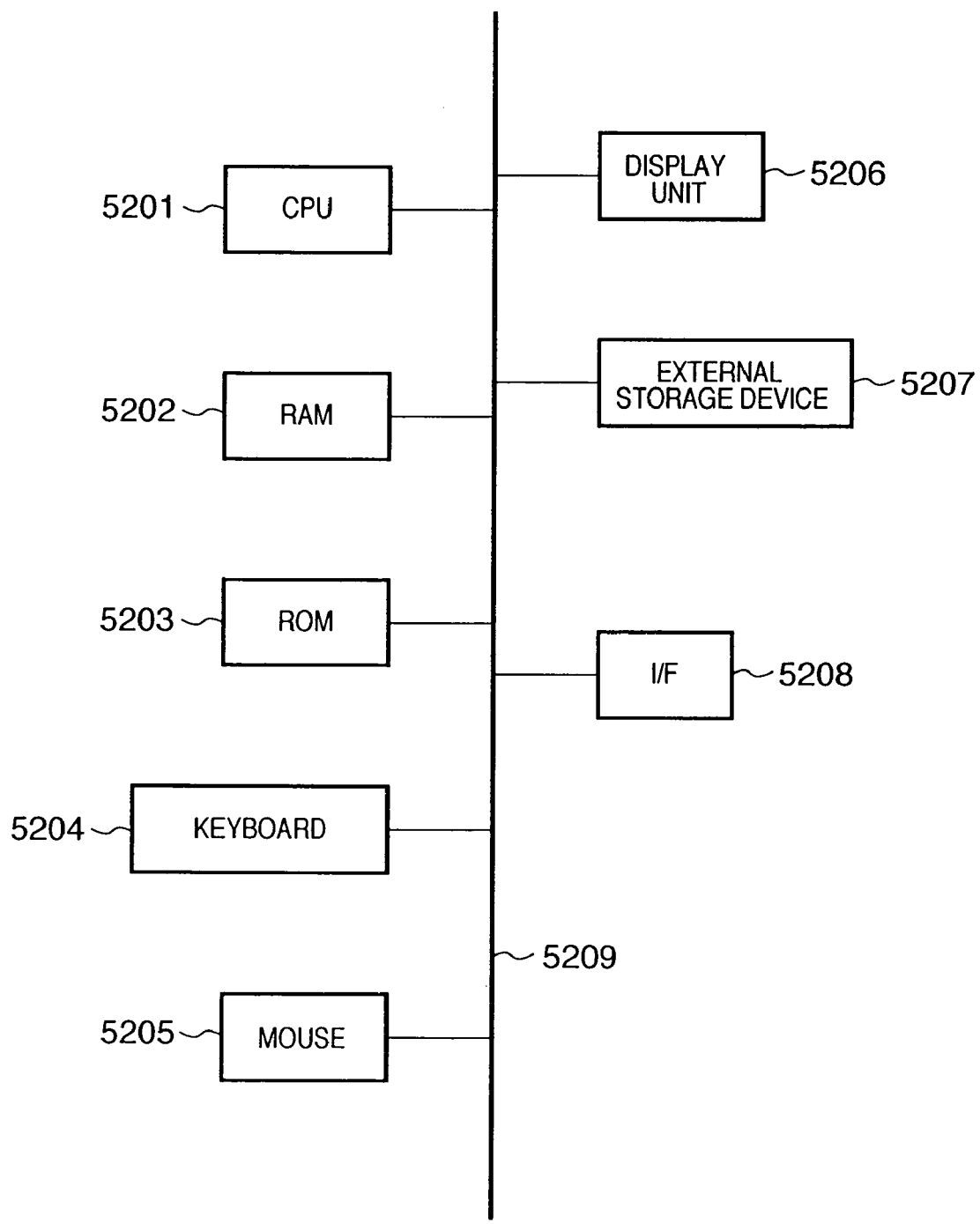
FIG. 17 is a block diagram showing the basic arrangement of a computer functioning as an image processing apparatus according to the second embodiment of the present invention.

FIG. 17 is a block diagram showing the basic arrangement of a computer functioning as an image processing apparatus according to the second embodiment. The computer is a general PC (Personal Computer) or WS (Work Station).

In FIG. 17, reference numeral 5201 denotes a CPU which controls the whole computer by using programs and data stored in a RAM 5202 and ROM 5203, and executes processes (to be described later) to be performed by the computer.

The RAM 5202 has an area for temporarily storing programs and data loaded from an external storage device 5207, and a work area necessary to perform various processes by the CPU 5201.

The ROM 5203 stores set data and a boot program of the computer.

Reference numerals 5204 and 5205 denote a keyboard and mouse, respectively, which allow inputting various instructions to the CPU 5201.

Reference numeral 5206 denotes a display unit which is formed from a CRT, liquid crystal screen, or the like, and can display with images and texts the results of various processes by the CPU 5201.

The external storage device 5207 is a large-capacity information storage device which is typified by a hard disk drive, and saves programs and data for causing an OS (Operating System) or the CPU 5201 to execute processes (to be described later) to be performed by the computer.

Reference numeral 5208 denotes an I/F (InterFace) which connects an external device such as a printer or digital camera.

Reference numeral 5209 denotes a bus which connects the above-described units.

Processes to be performed by the computer having the above arrangement will be explained.

Images are saved in the external storage device 5207, a plurality of folders for saving images are created in advance in the external storage device 5207, and the images are stored in corresponding folders.

In the second embodiment, a digital camera is connected to the I/F 5208, and a sensed image held by the digital camera is captured into the external storage device 5207. At this time, the CPU 5201 creates, in a storage area of the external storage device 5207, a folder whose folder name is an image sensing date and time represented by image sensing date & time information attached to the image, and saves the image in the folder. When a folder whose folder name is an image sensing date and time represented by image sensing date & time information attached to a captured image has already existed, no folder is newly created, and the captured image is stored in the existing folder.

With this process, images captured from the digital camera are classified into folders whose folder names are image sensing dates and times. As is known well, "to save an image in a folder" means to store an image in a storage area for a folder in the external storage device 5207. The storage process is controlled by the CPU 5201.

In the following description, one or more folders suffice to save images, and a method of storing an image in the external storage device 5207 and a method of creating a folder are not particularly limited.

In the second embodiment, after an image is stored in a folder, the index "favorite level" of the image is set to one of three levels by a predetermined application. For example, "3" is set for the most favorite image, and "1" is set for the least favorite image. Set index data is attached to an image and saved. The number of favorite levels to be set is not limited to "3".

Figure 18:
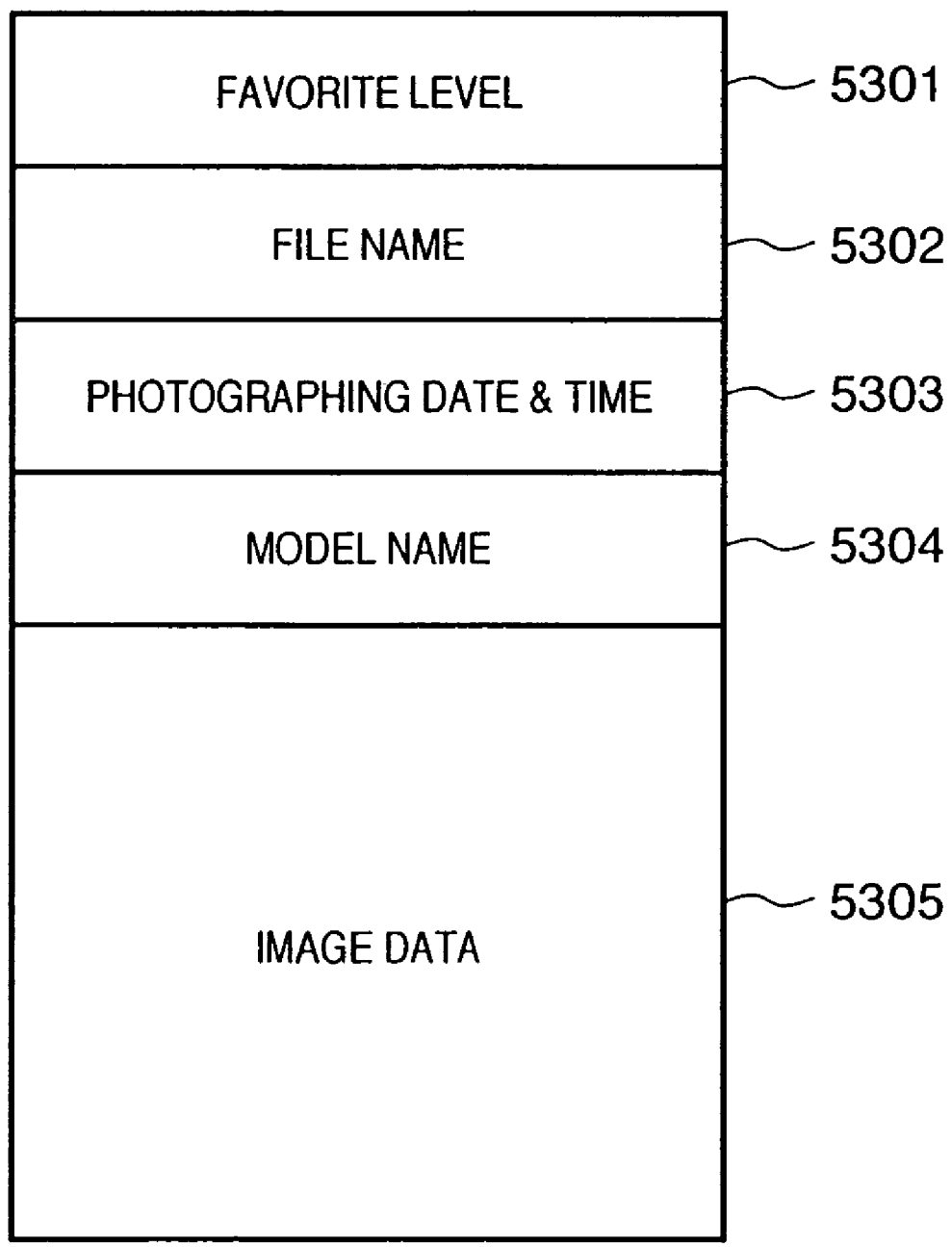
FIG. 18 is a view showing an example of the structure of image data having index data after an index "favorite level" is set.

FIG. 18 is a view showing an example of the structure of image data having index data after the index "favorite level" is set. As shown in FIG. 18, image data is made up of "favorite level" 5301, a file name 5302 of the image, an image sensing date & time 5303 of the image, a model name 5304 of a camera which senses the image, and an image data body 5305. As is well known, the file name 5302, image sensing date & time 5303, and model name 5304 are attached to an image data body when an image is sensed by a digital camera and captured into a computer. The "favorite level" 5301 is attached by the CPU 5201 by the above-described setting process.

In the second embodiment, each image data is stored together with its "favorite level" in a corresponding folder. By referring to the "favorite level", the CPU 5201 can obtain the "favorite level" of each image. Note that the structure of image data is not limited to the one shown in FIG. 18.

Figure 16:
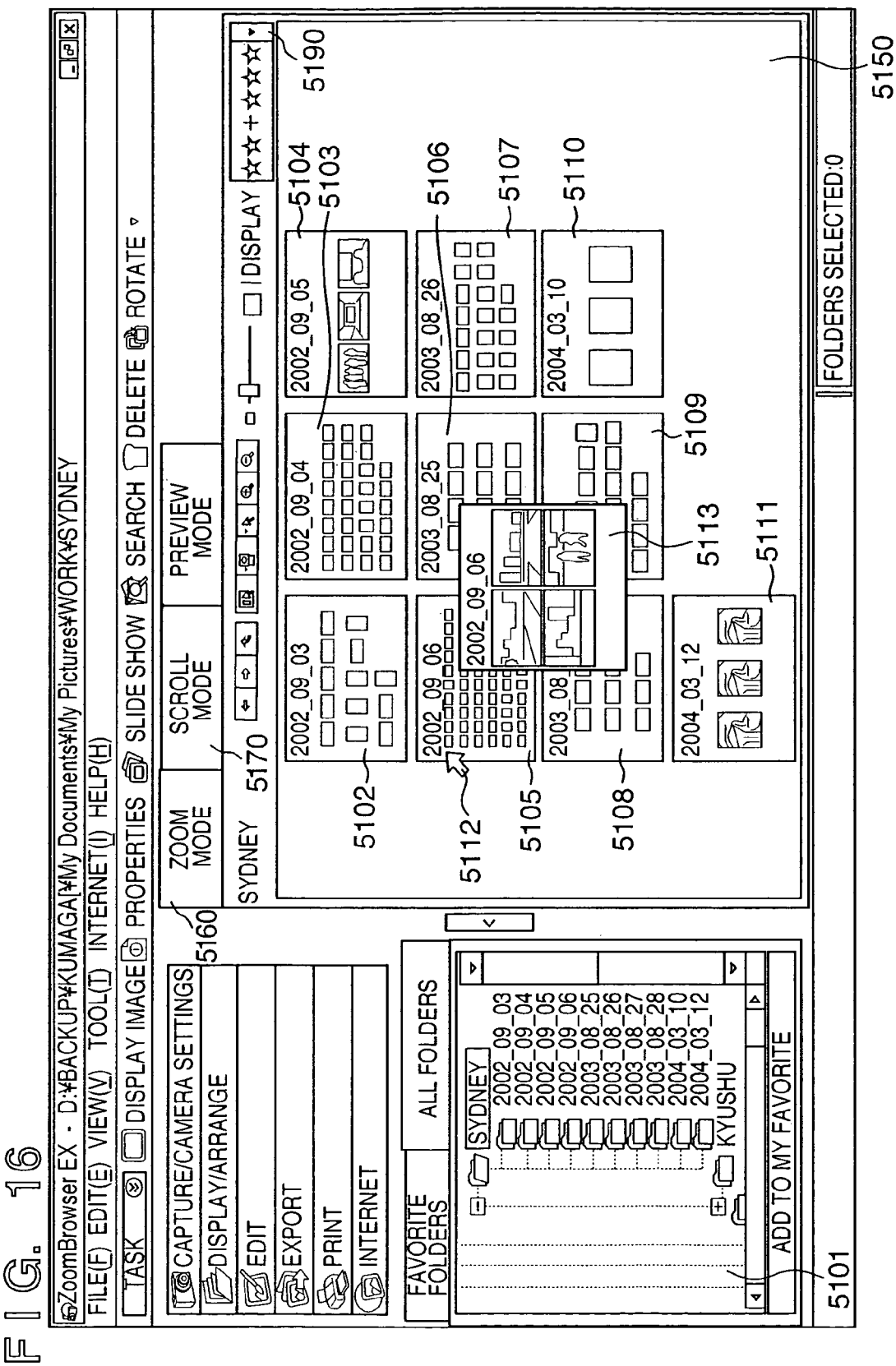
FIG. 16 is a view showing a display example of a GUI for listing and displaying images saved in each folder.

FIG. 16 is a view showing a display example of a GUI for listing and displaying images saved in each folder. The GUI in FIG. 16 is displayed when a tab 5160 is designated with the mouse 5205. When a tab 5170 is designated, another GUI (to be described later) is displayed. The operator designates the tab 5160 or 5170 with the keyboard 5204 or mouse 5205, and then the CPU 5201 can detect which tab has been designated and can display a GUI (e.g., GUI shown in FIG. 16 or GUI shown in FIG. 20) corresponding to the designated tab on the display screen of the display unit 5206. That is, the GUI display can be switched with the tab 5160 or 5170. A GUI displayed when each tab is operated will be explained.

<GUI Displayed when Tab 5160 is Designated>

The GUI shown in FIG. 16 is displayed when the tab 5160 is designated. The GUI in FIG. 16 is displayed on the display screen of the display unit 5206. The program and data of the GUI are saved in the external storage device 5207, loaded into the RAM 5202, and executed by the CPU 5201. As a result, the window shown in FIG. 16 is displayed on the display screen of the display unit 5206.

In FIG. 16, reference numeral 5101 denotes an area for listing and displaying a directory structure in the external storage device 5207. In FIG. 16, a folder "SYDNEY" is accompanied with 10 folders having folder names "2002_09_03", "2002_09_04", "2002_09_05", "2002_09_06", "2003_08_25", "2003_08_26", "2003_08_27", "2003_08_28", "2004_03_10", and "2004_03_12".

Reference numeral 5150 denotes an area for listing and displaying icons which represent folders subsidiary to a folder designated in the area 5101, and images which are stored in the folders subsidiary to the folder designated in the area 5101. In FIG. 16, since the folder "SYDNEY" is designated in the area 5101, icons 5102 to 5111 representing folders (i.e., the 10 folders) subsidiary to the folder "SYDNEY" are displayed in the area 5150, and images stored in the folders are also displayed as thumbnails on the icons. For example, in FIG. 16, the icon 5102 represents the folder "2002_09_03", a character string representing the folder name "2002_09_03" is displayed on the icon 5102, and the thumbnails of images stored in the folder "2002_09_03" are displayed. This also applies to the remaining folders.

In this manner, the folder name of a folder represented by each icon, and the thumbnails of images held in the folder are displayed on the icon.

Reference numeral 5112 denotes a cursor. The operator of the computer can operate the display position of the cursor 5112 with the mouse 5205, keyboard 5204, or the like in a known way. An icon can be designated by moving the display position of the cursor 5112 onto the icon. A window (to be referred to as a guide window hereinafter) 5113 which lists and displays, at a size larger than the size of the above-mentioned thumbnail, of images held in a folder represented by the designated icon, a predetermined number of images (when the number of images held in the folder does not reach a predetermined value, all the images) is displayed near the icon.

In FIG. 16, the cursor 5112 is positioned on the icon 5105, and the window 5113 is displayed near the icon 5105. The window 5113 lists and displays, at a size larger than the size of the above-mentioned thumbnail, four images out of images held in the folder (in FIG. 16, the folder "2002_09_06") represented by the icon 5105.

Figure 21:
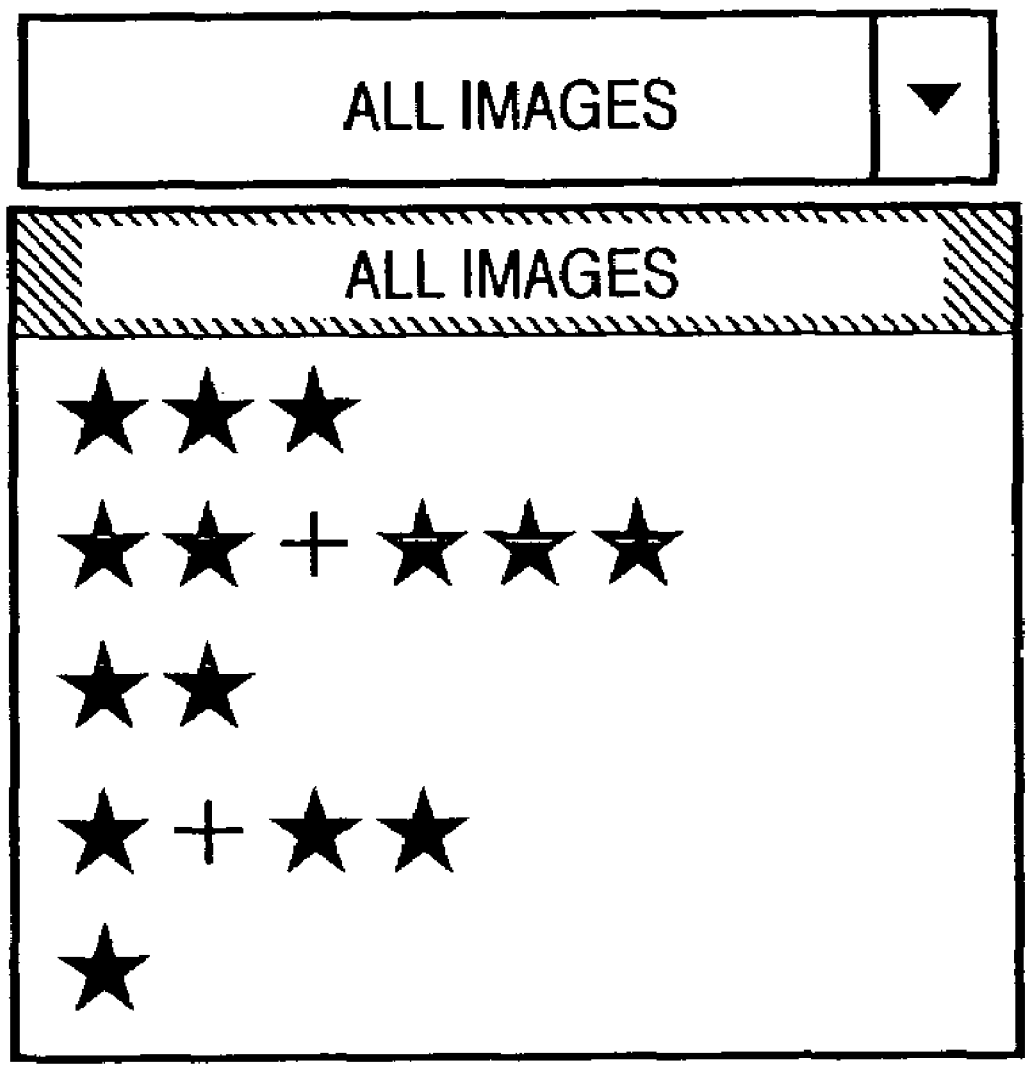
FIG. 21 is a view showing a list of display conditions presented when a menu 5190 is designated.

Thumbnail images displayed on the icons 5102 to 5111 will be explained. When a menu 5190 is operated, the CPU 5201 refers to a display condition set from the menu 5190. FIG. 21 is a view showing a list of display conditions presented when the menu 5190 is designated. Menu designation operation is known well, and a description thereof will be omitted.

When a display condition "all images" is selected in FIG. 21, the CPU 5201 executes for all folders a process of listing and displaying, on the icon of a folder, all images (regardless of the favorite level) held in the folder.

When a display condition "*" is selected, the CPU 5201** executes for all folders a process of listing and displaying, on the icon of a folder, images whose favorite levels are "3" out of all images held in the folder.

When a display condition "+*" is selected, the CPU 5201 executes for all folders a process of listing and displaying, on the icon of a folder, images whose favorite levels are "2" or "3" out of all images held in the folder.

When a display condition "" is selected, the CPU 5201** executes for all folders a process of listing and displaying, on the icon of a folder, images whose favorite levels are "2" out of all images held in the folder.

When a display condition "*+" is selected, the CPU 5201** executes for all folders a process of listing and displaying, on the icon of a folder, images whose favorite levels are "1" or "2" out of all images held in the folder.

When a display condition "*" is selected, the CPU 5201 executes for all folders a process of listing and displaying, on the icon of a folder, images whose favorite levels are "1" out of all images held in the folder.

The operator can set a display condition by designating one of these display conditions by using the keyboard 5204 or mouse 5205. The CPU 5201 lists and displays, on the icon of a folder, only images which satisfy the set display condition out of all images held in the folder.

As described above, the favorite level is set for each image, a display condition is set from the menu 5190, and thereby images displayed on the icons 5102 to 5111 can be changed in accordance with user's preferences. On the GUI in FIG. 16, "+*" is set as a display condition, and images whose favorite levels are "2" or "3" are displayed on the icons 5102 to 5111.

Figure 22:
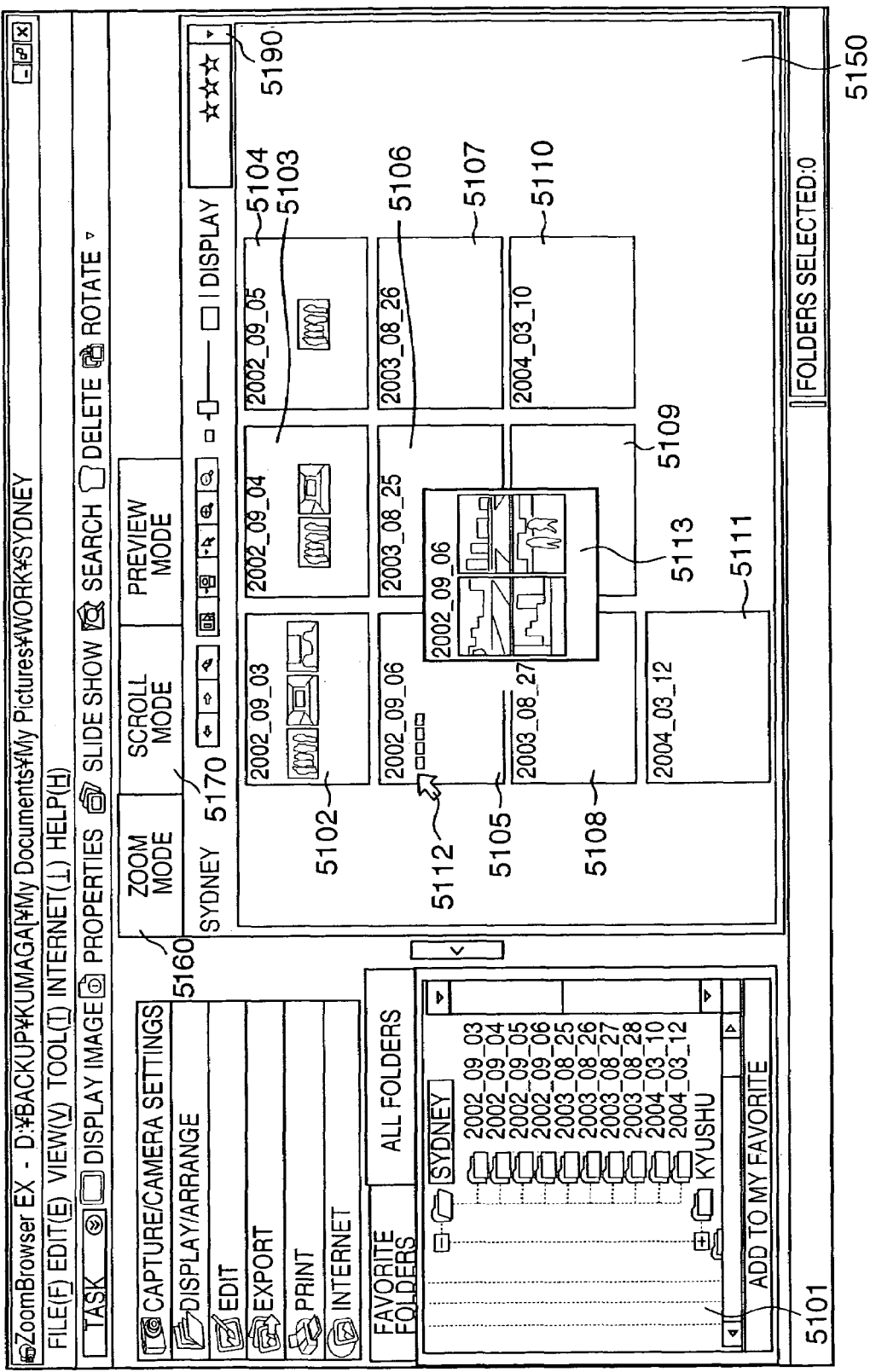
FIG. 22 is a view showing a display example of a GUI displayed on the display screen of a display unit 5206 when the menu 5190 is operated on the GUI of FIG. 16 to set or reset the display condition to "***"

FIG. 22 shows a display example of a GUI when the menu 5190 is operated to set the display condition to "***".

FIG. 22 is a view showing a display example of a GUI displayed on the display screen of the display unit 5206 when the menu 5190 is operated on the GUI of FIG. 16 to set or reset the display condition to "*" The number of thumbnail images displayed on each icon is smaller than that on the GUI shown in FIG. 16 because the display condition "*" is stricter than the display condition "+*".

<GUI Displayed when Tab 5170 is Designated>

Figure 20:
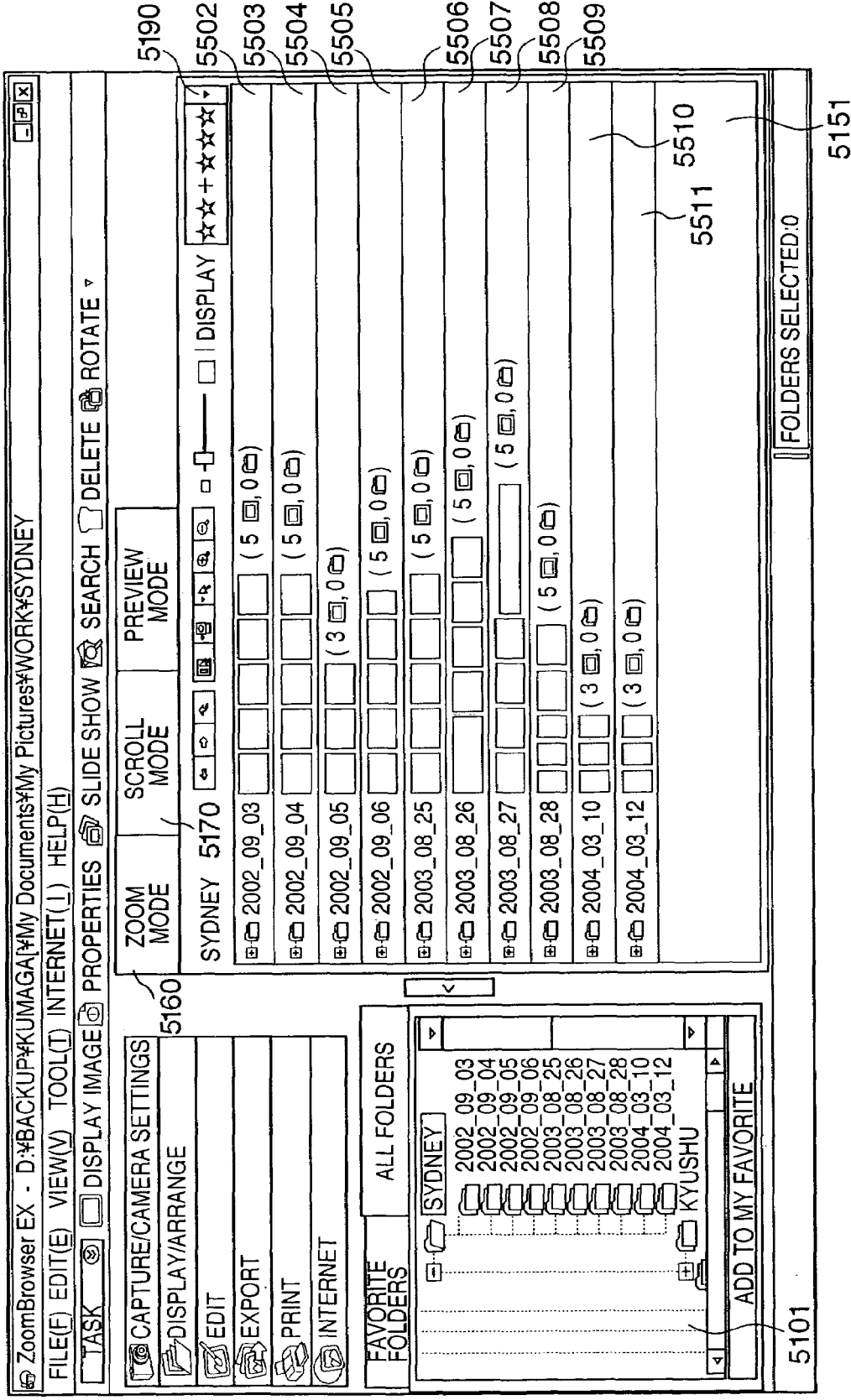
FIG. 20 is a view showing a display example of a GUI for listing and displaying images saved in each folder.

FIG. 20 is a view showing a display example of a GUI for listing and displaying images saved in each folder. The GUI shown in FIG. 20 is displayed when the tab 5170 is designated. The GUI in FIG. 20 is displayed on the display screen of the display unit 5206. The program and data of the GUI are saved in the external storage device 5207, loaded into the RAM 5202, and executed by the CPU 5201. As a result, the window shown in FIG. 20 is displayed on the display screen of the display unit 5206.

On the GUI (FIGS. 16 and 22) displayed when the tab 5160 is designated, of images held in a folder, images which satisfy a display condition are displayed on an icon representing the folder. On the GUI (FIGS. 20 and 23) displayed when the tab 5170 is designated, of images held in a folder, images which satisfy a display condition are displayed beside an icon representing the folder.

In FIG. 20, the same reference numerals as in FIG. 16 denote the same parts, and a description thereof will be omitted.

In FIG. 20, reference numerals 5502 to 5511 denote display areas corresponding to the 10 folders subsidiary to the folder "SYDNEY", and the display area 5502 will be exemplified. In the display area 5502, the icon of the folder "2002_09_03", and of images held in the folder, images which satisfy a display condition set from the menu 5190 are displayed side by side. This also applies to the display areas 5503 to 5511, and "an icon representing a folder" and "images which satisfy a display condition set from the menu 5190 out of images held in the folder" are displayed side by side for a corresponding folder.

The number of "images which satisfy a display condition set from the menu 5190 out of images held in a folder", which are displayed in the display area (one of 5502 to 5511), may be set in advance, or "all images which satisfy a display condition set from the menu 5190 out of images held in a folder" may be displayed beside the icon of the folder without particularly setting the number of images to be displayed.

On the GUI of FIG. 20, "+*" is set as a display condition, and images whose favorite levels are "2" or "3" are displayed in the display areas 5502 to 5511.

Figure 23:
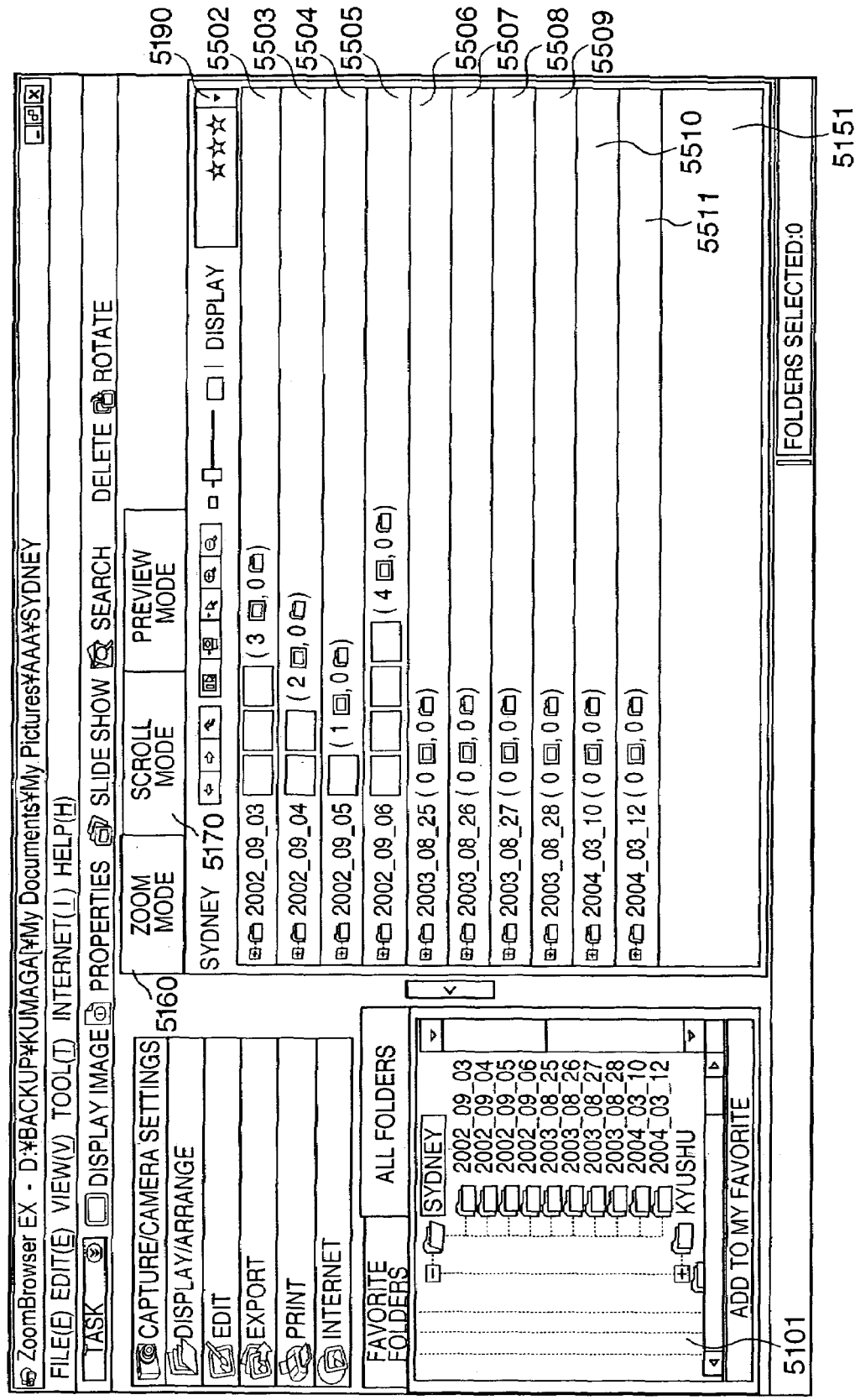
FIG. 23 is a view showing a display example of a GUI displayed on the display screen of the display unit 5206 when the menu 5190 is operated on the GUI of FIG. 20 to set or reset the display condition to "***"

FIG. 23 shows a display example of a GUI when the menu 5190 is operated to set the display condition to "***".

FIG. 23 is a view showing a display example of a GUI displayed on the display screen of the display unit 5206 when the menu 5190 is operated on the GUI of FIG. 20 to set or reset the display condition to "*". The number of thumbnail images displayed side by side in each display area is smaller than that on the GUI shown in FIG. 20 because the display condition "*" is stricter than the display condition "+*".

There are various display forms for displaying a folder on a given layer and images held in the folder, and the display form is not limited to those shown in FIGS. 16 and 20.

<Display Process>

FIG. 19 is a flowchart showing a process of listing and displaying images saved in each folder. A program and data which cause the CPU 5201 to execute a process complying with the flowchart of FIG. 19 are loaded from the external storage device 5207 into the RAM 5202 under the control of the CPU 5201. The program and data are executed by the CPU 5201, and the computer can perform various processes (to be described later).

The CPU 5201 checks which of the tabs 5160 and 5170 is designated (step S5501). If the tab 5160 is designated, the display mode of the GUI is determined to be a "zoom mode", and the process advances to step S5502. If the tab 5170 is designated, the display mode of the GUI is determined to be a "scroll mode", and the process advances to step S5552.

A GUI display process in the "zoom mode" will be described. A GUI in the "zoom mode" provides a display form in which images held in each folder are displayed on the icon of the folder, as shown in FIGS. 16 and 22. Target images are displayed in areas except the area 5150 in FIG. 16 or 22 (step S5502).

When the icon of a folder is located at the current position of the cursor 5112, the file name of the folder is specified (step S5503), and a predetermined number of images out of images held in the folder having the specified file name are displayed in the guide window (step S5504). Details of the process in step S5504 will be described with reference to FIG. 24.

It is determined whether the position of the cursor 5112 has changed (step S5505). If YES in step S5505, the process returns to step S5503, and the subsequent process is repeated.

If NO in step S5505, the process advances to step S5506, and it is determined whether the display condition has been set again from the menu 5190 (step S5506). If YES in step S5506, the process returns to step S5503, and the subsequent process is repeated.

If NO in step S5506, the process advances to step S5507, and it is checked whether the number of images held in each folder or the file name has been changed (step S5507). If YES in step S5507, the process returns to step S5503, and the subsequent process is repeated.

If NO in step S5507, the process advances to step S5508, and it is checked whether the "favorite level" of each of images held in each folder has been changed (step S5508). If YES in step S5508, the process returns to step S5503, and the subsequent process is repeated.

If NO in step S5508, the process advances to step S5509, and the subsequent process is executed for each folder.

By referring to the "favorite level" of each of images held in a folder of interest, it is determined whether a numerical value represented by the referred favorite level is equal to or smaller than a value represented by a currently set display condition. That is, it is determined whether an image satisfies the display condition. The thumbnail image of an image having a "favorite level" which is equal to or smaller than the value represented by the currently set display condition is created, and displayed on the icon of the folder of interest. This process is executed for all folders.

Upon the completion of the process, the process advances to step S5510 to check whether the display mode has been changed, i.e., in the second embodiment, whether the tab 5170 has been designated. If NO in step S5510, the process returns to step S5505, and the subsequent process is repeated.

If YES in step S5510, the process returns to step S5501, and the subsequent process is repeated.

A GUI display process in the "scroll mode" will be described. A GUI in the "scroll mode" provides a display form in which images held in each folder are displayed beside the icon of the folder, as shown in FIGS. 20 and 23. Target images are displayed in areas except an area 5151 in FIG. 20 or 23 (step S5502).

It is determined whether the display condition has been set again from the menu 5190 (step S5556). If YES in step S5556, the process returns to step S5556, and the subsequent process is repeated.

If NO in step S5556, the process advances to step S5557, and it is checked whether the number of images held in each folder or the file name has been changed (step S5557). If YES in step S5557, the process returns to step S5556, and the subsequent process is repeated.

If NO in step S5557, the process advances to step S5558, and it is checked whether the "favorite level" of each of images held in each folder has been changed. If YES in step S5558, the process returns to step S5556, and the subsequent process is repeated.

If NO in step S5558, the process advances to step S5559, and thumbnail images and the icon of a corresponding folder are displayed side by side in the display area (in FIG. 20, one of the areas 5502 to 5511). Details of the process in step S5559 will be described with reference to FIG. 25.

Upon the completion of the process, the process advances to step S5560 to check whether the display mode has been changed, i.e., in the second embodiment, whether the tab 5160 has been designated. If NO in step S5560, the process returns to step S5556, and the subsequent process is repeated. If YES in step S5560, the process returns to step S5501, and the subsequent process is repeated.

Figure 24:
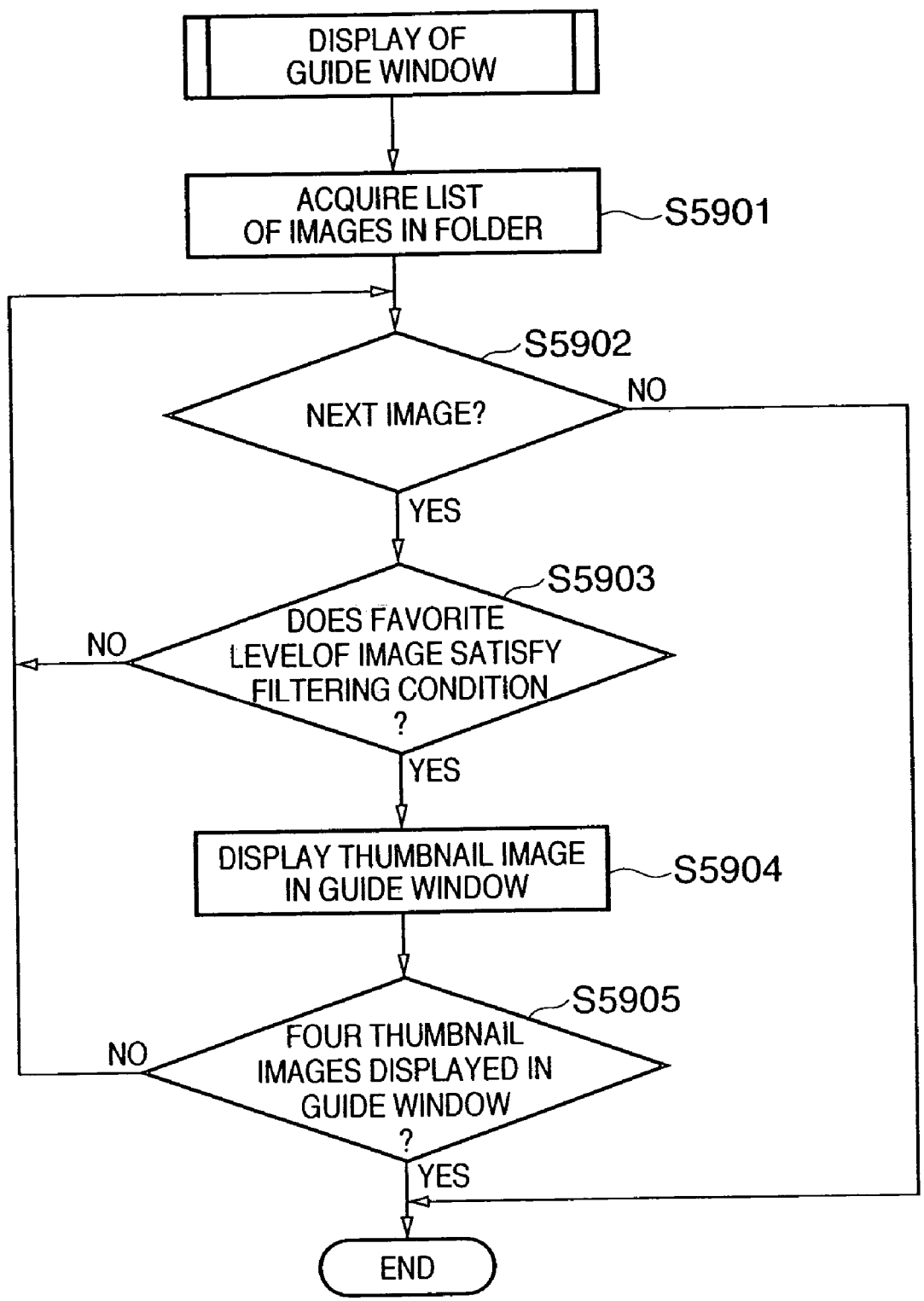
FIG. 24 is a flowchart showing details of a process in step S5504.

FIG. 24 is a flowchart showing details of the process in step S5504.

When the CPU 5201 detects that the cursor 5112 is located on a given icon (to be referred to as an icon of interest hereinafter), all images in a folder represented by the icon of interest (images saved in a storage area of the external storage device 5207 that is assigned to the folder represented by the icon of interest) are referred to (step S5901). If an unprocessed image exists, the process advances from step S5902 to step S5903. The CPU 5201 refers to the "favorite level" of the unprocessed image (to be referred to as an image of interest hereinafter), and determines whether a numerical value represented by the referred favorite level is equal to or smaller than a value represented by a currently set display condition, i.e., whether the image satisfies the display condition (step S5903). If NO in step S5903, the process returns to step S5902, and the subsequent process is done for the next image.

If YES in step S5903, the process advances to step S5904, and the thumbnail image of the image of interest is created and displayed in the guide window displayed near the icon of interest (step S5904). It is determined whether the number of thumbnail images displayed in the guide window displayed near the icon of interest has reached a predetermined value (in this case, four) (step S5905). If YES in step S5905, the process is completed; if NO, returns to step S5902 to perform the subsequent process for the next image. If there is no next image to be referred to in step S5902, the process is completed.

Figure 25:
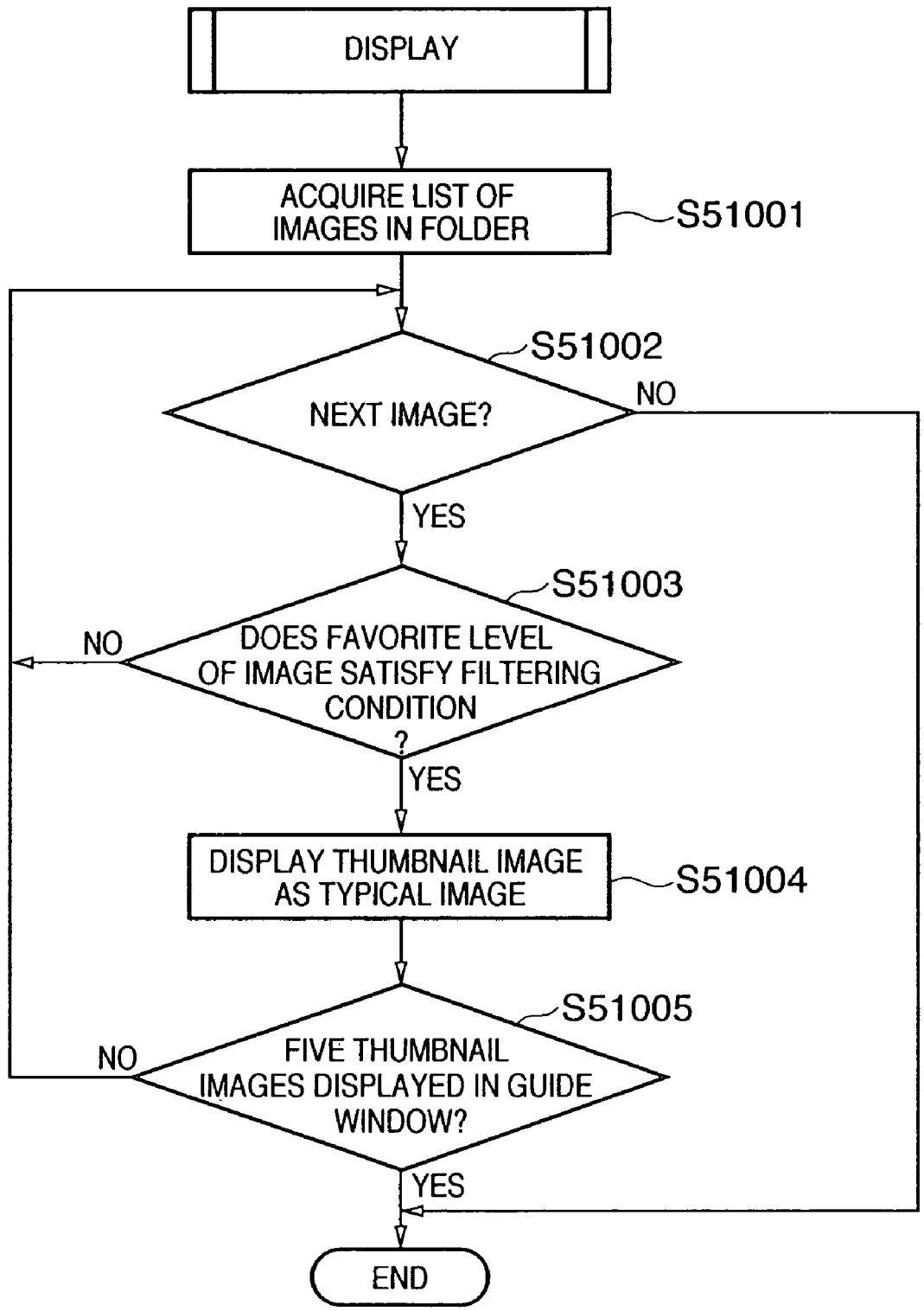
FIG. 25 is a flowchart showing details of a process in step S5559.

FIG. 25 is a flowchart showing details of the process in step S5559. When a plurality of folders exist, a process complying with the flowchart of FIG. 25 is executed for each folder.

All images in a folder of interest (images saved in a storage area of the external storage device 5207 that is assigned to the folder of interest) are referred to (step S51001). If an unprocessed image exists, the process advances from step S51002 to step S51003. The CPU 5201 refers to the "favorite level" of the unprocessed image (to be referred to as an image of interest hereinafter), and determines whether a numerical value represented by the referred favorite level is equal to or smaller than a value represented by a currently set display condition, i.e., whether the image satisfies the display condition (step S51003). If NO in step S51003, the process returns to step S51002, and the subsequent process is done for the next image.

If YES in step S51003, the process advances to step S51004, and the thumbnail image of the image of interest is created and displayed beside the icon of the folder of interest, as shown in FIGS. 20 and 23 (step S51004). It is determined whether the number of thumbnail images displayed beside the icon of the folder of interest has reached a predetermined value (in this case, five) (step S51005). If YES in step S51005, the process is completed; if NO, returns to step S51002 to perform the subsequent process for the next image. If there is no next image to be referred to in step S51002, the process is completed.

From the above description, according to the second embodiment, the operator can set an image to be displayed out of images held in a folder.

In the second embodiment, the operator sets the "favorite level" and display condition, and can set an image to be displayed on the icon of a folder. Instead of the "favorite level", a flag representing "whether to or not to display an image" may be simply set for each image by the operator and attached to an image. In this case, the CPU 5201 refers to the flag and determines whether to display an image. In this fashion, data set by the operator in order to set an image to be displayed on the icon of a folder is not limited to the above-described data.

In the above description, images displayed in the guide window are the thumbnail images of a predetermined number of images which satisfy a display condition out of images in a folder designated by the cursor 5112. Regardless of the display condition, the thumbnail images of a predetermined number of images out of images in a folder designated by the cursor 5112 may be simply displayed in the guide window.

Other Embodiment

The present invention can take an embodiment as a system, apparatus, method, program, storage medium, or the like. More specifically, the present invention may be applied to a system including a plurality of devices or an apparatus formed by a single device.

The present invention is also achieved by supplying a software program (in the above embodiments, programs corresponding to the flowcharts shown in the drawings) for realizing the functions of the above-described embodiments to a system or apparatus directly or from a remote place, and reading out and executing the supplied program codes by the computer of the system or apparatus.

The present invention is therefore realized by program codes installed in the computer in order to realize functional processing of the present invention by a computer. That is, the present invention includes a computer program for realizing functional processing of the present invention.

In this case, the present invention can take any form such as an object code, a program executed by an interpreter, or script data supplied to an OS as long as a program function is attained.

A recording medium for supplying the program includes a floppy® disk, hard disk, optical disk, magnetooptical disk, MO, CD-ROM, CD-R, CD-RW, magnetic tape, nonvolatile memory card, ROM, and DVD (DVD-ROM and DVD-R).

As another program supply method, the program can be supplied by connecting a client computer to an Internet Web page via the browser of the client computer, and downloading the computer program of the present invention or a compressed file containing an automatic installing function from the Web page to a recording medium such as a hard disk. The program can also be realized by grouping program codes which constitute the program of the present invention into a plurality of files, and downloading the files from different Web pages. That is, the present invention also includes a WWW server which allows a plurality of users to download the program files for realizing functional processing of the present invention by a computer.

The program of the present invention can be encrypted, stored in a storage medium such as a CD-ROM, and distributed to the user. A user who satisfies predetermined conditions is prompted to download decryption key information from a Web page via the Internet. The user executes the encrypted program by using the key information, and installs the program in the computer.

The functions of the above-described embodiments are realized when the computer executes the readout program codes. Also, the functions of the above-described embodiments are realized when an OS or the like running on the computer performs some or all of actual processes on the basis of the instructions of the program codes.

The functions of the above-described embodiments are realized when the program read out from the recording medium is written in the memory of a function expansion board inserted into the computer or the memory of a function expansion unit connected to the computer, and the CPU of the function expansion board or function expansion unit performs some or all of actual processes on the basis of the instructions of the program codes.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application Nos. 2004-221951 filed on Jul. 29, 2004, and 2004-255774 filed on Sep. 2, 2004, which are hereby incorporated by reference herein.

What is claimed is:

1. An image display apparatus including at least one processor, comprising:
  a display unit which displays a plurality of thumbnail images, in a form of a list;
  an acquisition unit which acquires attribute information related to a thumbnail image which is selected, on the basis of a user's instruction, from the plurality of thumbnail images;
  a first generation unit which reduces an original image which is a reduction source of the selected thumbnail image, to generate a first viewing thumbnail image whose size is a first size;

a comparison unit which compares a size of the selected thumbnail image with the first size;

a second generation unit which reduces, if the size of the selected thumbnail image is larger than the first size, the original image to generate a second viewing thumbnail image whose size is a second size larger than the size of the selected thumbnail image; and a display control unit which generates a window and displays the generated window near the selected thumbnail image, wherein said display control unit arranges the first viewing thumbnail image and the attribute information on the window if the size of the selected thumbnail image is equal to or less than the first size, and arranges the second viewing thumbnail image and the attribute information on the window if the size of the selected thumbnail image is larger than the first size, and wherein, said display control unit comprises a unit which determines whether or not the first or second viewing thumbnail image is arranged on the window, when it is determined that the first or second viewing thumbnail image is arranged on the window and if the size of the selected thumbnail image is larger the first size, said display control unit arranges the second viewing thumbnail image and the attribute information on the window, and when it is determined that neither of the first and second viewing thumbnail images is arranged on the window and if the size of the selected thumbnail image is larger the first size, said display control unit arranges only the attribute information on the window.

2. An image display apparatus including at least one processor, comprising:

a display unit which displays a plurality of thumbnail images, in a form of a list;

an acquisition unit which acquires attribute information related to a thumbnail image which is selected, on the basis of a user's instruction, from the plurality of thumbnail images;

a comparison unit which compares a size of the selected thumbnail image with a predetermined size;

a generation unit which, if the size of the selected thumbnail image is less than the predetermined size, reduces an original image which is a reduction source of the selected thumbnail image, to generate a viewing thumbnail image whose size is larger than that of the selected thumbnail image; and a display control unit which generates a window and displays the generated window near the selected thumbnail image, wherein said display control unit arranges the viewing thumbnail image and the attribute information on the window if the size of the selected thumbnail image is less than the predetermined size, and arranges the attribute information on the window if the size of the selected thumbnail image is equal to or larger than the predetermined size, wherein a size of each of the plurality of thumbnail images displayed by said display unit is defined by a size of an area in which the plurality of thumbnail images are displayed and the number of the thumbnail images to be displayed in the area, and wherein, when the attribute information of the selected thumbnail image indicates that the selected thumbnail image is rotated by predetermined angle, said generation unit rotates the generated viewing thumbnail image by the predetermined angle.

3. The apparatus according to claim 2, further comprising:
a detection unit which detects that a mouse pointer is on one of the plurality of thumbnail images displayed by said display unit, and wherein said acquisition unit acquires attribute information of said one of the plurality of thumbnail images.

4. The apparatus according to claim 2, wherein the attribute information is text data in which at least one of a file name, a file size, and file updating date and time of the original image is described.

5. An image display apparatus including at least one processor, comprising:

a display unit which displays a plurality of thumbnail images in an area corresponding to a folder in which original images, which are reduction sources of the plurality of thumbnail images, respectively are stored;

an acquisition unit which, when a user's instruction represents a designation of a thumbnail image displayed in the area, acquires attribute information related to the designated thumbnail image;

a comparison unit which compares a size of the designated thumbnail image with a predetermined size;

a generation unit which, if the size of the designated thumbnail image is less than the predetermined size, reduces an original image which is a reduction source of the designated thumbnail image, to generate a viewing thumbnail image whose size is larger than that of the designated thumbnail image;

a display control unit which generates a window and displays the generated window near the designated thumbnail image, wherein said display control unit arranges the viewing thumbnail image and the attribute information on the window if the size of the designated thumbnail image is less than the predetermined size, and arranges the attribute information on the window if the size of the designated thumbnail image is equal to or larger than the predetermined size;

a second acquisition unit which acquires folder attribute information which is related to the folder, when the user's instruction represents a designation of a region, other than the plurality of thumbnail images, in the area; and a second display control unit which, when the user's instruction represents a designation of the region, generates a second window and displays the generated second window near the folder, wherein said second display control unit arranges the folder attribute information and all or part of the plurality of thumbnail images on the second window, wherein when the user's instruction represents a designation of the region, a second display control unit arranges on the second window the folder attribute information and thumbnail images selected from the plurality of thumbnail images on the basis of ratings related to the original images of the plurality of thumbnail images.

6. The apparatus according to claim 5, wherein when the user's instruction represents a designation of the region, a second display control unit arranges the folder attribute information and predetermined number of thumbnail images on the second window.

7. An image display method, comprising:
a display step which displays a plurality of thumbnail images, in a form of a list;
an acquisition step which acquires attribute information related to a thumbnail image which is selected, on the basis of a user's instruction, from the plurality of thumbnail images;

a first generation step which reduces an original image which is a reduction source of the selected thumbnail image, to generate a first viewing thumbnail image whose size is a first size;

a comparison step which compares a size of the selected thumbnail image with the first size;

a second generation step which reduces, if the size of the selected thumbnail image is larger than the first size, the original image to generate a second viewing thumbnail image whose size is a second size larger than the size of the selected thumbnail image; and a display control step which generates a window and displays the generated window near the selected thumbnail image, wherein said display control step arranges the first viewing thumbnail image and the attribute information on the window if the size of the selected thumbnail image is equal to or less than the first size, and arranges the second viewing thumbnail image and the attribute information on the window if the size of the selected thumbnail image is larger than the first size, and wherein, said display control unit comprises a unit which determines whether or not the first or second viewing thumbnail image is arranged on the window, when it is determined that the first or second viewing thumbnail image is arranged on the window and if the size of the selected thumbnail image is larger the first size, said display control unit arranges the second viewing thumbnail image and the attribute information on the window, and when it is determined that neither of the first and second viewing thumbnail images is arranged on the window and if the size of the selected thumbnail image is larger the first size, said display control unit arranges only the attribute information on the window.

8. An image display method, comprising:

a display step which displays a plurality of thumbnail images, in a form of a list;

an acquisition step which acquires attribute information related to a thumbnail image which is selected, on the basis of a user's instruction, from the plurality of thumbnail images;

a comparison step which compares a size of the selected thumbnail image with a predetermined size;

a generation step which, if the size of the selected thumbnail image is less than the predetermined size, reduces an original image which is a reduction source of the selected thumbnail image, to generate a viewing thumbnail image whose size is larger than that of the selected thumbnail image; and a display control step which generates a window and displays the generated window near the selected thumbnail image, wherein said display control step arranges the viewing thumbnail image and the attribute information on the window if the size of the selected thumbnail image is less than the predetermined size, and arranges the attribute information on the window if the size of the selected thumbnail image is equal to or larger than the predetermined size, wherein a size of each of the plurality of thumbnail images displayed by said display unit is defined by a size of an area in which the plurality of thumbnail images are displayed and the number of the thumbnail images to be displayed in the area, and wherein, when the attribute information of the selected thumbnail image indicates that the selected thumbnail image is rotated by predetermined angle, said generation unit rotates the generated viewing thumbnail image by the predetermined angle.

9. An image display method, comprising:

a display step which displays a plurality of thumbnail images in an area corresponding to a folder in which original images, which are reduction sources of the plurality of thumbnail images, respectively are stored;

an acquisition step which, when a user's instruction represents a designation of a thumbnail image displayed in the area, acquires attribute information related to the designated thumbnail image;

a comparison step which compares a size of the designated thumbnail image with a predetermined size;

a generation step which, if the size of the designated thumbnail image is less than the predetermined size, reduces an original image which is a reduction source of the designated thumbnail image, to generate a viewing thumbnail image whose size is larger than that of the designated thumbnail image;

a display control step which generates a window and displays the generated window near the designated thumbnail image, wherein said display control step arranges the viewing thumbnail image and the attribute information on the window if the size of the designated thumbnail image is less than the predetermined size, and arranges the attribute information on the window if the size of the designated thumbnail image is equal to or larger than the predetermined size;

a second acquisition step which acquires folder attribute information which is related to the folder, when the user's instruction represents a designation of a region, other than the plurality of thumbnail images, in the area; and a second display control unit which, when the user's instruction represents a designation of the region, generates a second window and displays the generated second window near the folder, wherein said second display control unit arranges the folder attribute information and all or part of the plurality of thumbnail images on the second window, wherein when the user's instruction represents a designation of the region, a second display control unit arranges on the second window the folder attribute information and thumbnail images selected from the plurality of thumbnail images on the basis of ratings related to the original images of the plurality of thumbnail images.

10. A computer-readable storage medium having a program stored thereon for performing steps comprising:

a display step which displays a plurality of thumbnail images, in a form of a list;

an acquisition step which acquires attribute information related to a thumbnail image which is selected, on the basis of a user's instruction, from the plurality of thumbnail images;

a first generation step which reduces an original image which is a reduction source of the selected thumbnail image, to generate a first viewing thumbnail image whose size is a first size;

a comparison step which compares a size of the selected thumbnail image with the first size;

a second generation step which reduces, if the size of the selected thumbnail image is larger than the first size, the original image to generate a second viewing thumbnail image whose size is a second size larger than the size of the selected thumbnail image; and a display control step which generates a window and displays the generated window near the selected thumbnail image, wherein said display control step arranges the first viewing thumbnail image and the attribute information on the window if the size of the selected thumbnail image is equal to or less than the first size, and arranges the second viewing thumbnail image and the attribute information on the window if the size of the selected thumbnail image is larger than the first size, and wherein, said display control unit comprises a unit which determines whether or not the first or second viewing thumbnail image is arranged on the window, when it is determined that the first or second viewing thumbnail image is arranged on the window and if the size of the selected thumbnail image is larger the first size, said display control unit arranges the second viewing thumbnail image and the attribute information on the window, and when it is determined that neither of the first and second viewing thumbnail images is arranged on the window and if the size of the selected thumbnail image is larger the first size, said display control unit arranges only the attribute information on the window.

11. A computer-readable storage medium having a program stored thereon for performing steps comprising:

a display step which displays a plurality of thumbnail images, in a form of a list;

an acquisition step which acquires attribute information related to a thumbnail image which is selected, on the basis of a user's instruction, from the plurality of thumbnail images;

a comparison step which compares a size of the selected thumbnail image with a predetermined size;

a generation step which, if the size of the selected thumbnail image is less than the predetermined size, reduces an original image which is a reduction source of the selected thumbnail image, to generate a viewing thumbnail image whose size is larger than that of the selected thumbnail image; and a display control step which generates a window and displays the generated window near the selected thumbnail image, wherein said display control step arranges the viewing thumbnail image and the attribute information on the window if the size of the selected thumbnail image is less than the predetermined size, and arranges the attribute information on the window if the size of the selected thumbnail image is equal to or larger than the predetermined size, wherein a size of each of the plurality of thumbnail images displayed by said display step is defined by a size of an area in which the plurality of thumbnail images are displayed and the number of the thumbnail images to be displayed in the area, and wherein, when the attribute information of the selected thumbnail image indicates that the selected thumbnail image is rotated by predetermined angle, said generation unit rotates the generated viewing thumbnail image by the predetermined angle.

12. A computer-readable storage medium having a program stored thereon for performing steps comprising:

a display step which displays a plurality of thumbnail images in an area corresponding to a folder in which original images, which are reduction sources of the plurality of thumbnail images, respectively are stored;

an acquisition step which, when a user's instruction represents a designation of a thumbnail image displayed in the area, acquires attribute information related to the designated thumbnail image;

a comparison step which compares a size of the designated thumbnail image with a predetermined size;

a generation step which, if the size of the designated thumbnail image is less than the predetermined size, reduces an original image which is a reduction source of the designated thumbnail image, to generate a viewing thumbnail image whose size is larger than that of the designated thumbnail image;

a display control step which generates a window and displays the generated window near the designated thumbnail image, wherein said display control step arranges the viewing thumbnail image and the attribute information on the window if the size of the designated thumbnail image is less than the predetermined size, and arranges the attribute information on the window if the size of the designated thumbnail image is equal to or larger than the predetermined size;

a second acquisition step which acquires folder attribute information which is related to the folder, when the user's instruction represents a designation of a region, other than the plurality of thumbnail images, in the area; and a second display control step which, when the user's instruction represents a designation of the region, generates a second window and displays the generated second window near the folder, wherein said second display control unit arranges the folder attribute information and all or part of the plurality of thumbnail images on the second window, wherein when the user's instruction represents a designation of the region, a second display control unit arranges on the second window the folder attribute information and thumbnail images selected from the plurality of thumbnail images on the basis of ratings related to the original images of the plurality of thumbnail images.

* * * * *